US010609395B2

United States Patent
Kerofsky et al.

(10) Patent No.: US 10,609,395 B2
(45) Date of Patent: Mar. 31, 2020

(54) HIGH DYNAMIC RANGE VIDEO CODING ARCHITECTURES WITH MULTIPLE OPERATING MODES

(71) Applicant: Vid Scale, Inc., Wilmington, DE (US)

(72) Inventors: Louis Kerofsky, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 60 days.

(21) Appl. No.: 15/748,095

(22) PCT Filed: Jul. 28, 2016

(86) PCT No.: PCT/US2016/044354
§ 371 (c)(1),
(2) Date: Jan. 26, 2018

(87) PCT Pub. No.: WO2017/019818
PCT Pub. Date: Feb. 2, 2017

(65) Prior Publication Data
US 2018/0242006 A1 Aug. 23, 2018

Related U.S. Application Data

(60) Provisional application No. 62/198,089, filed on Jul. 28, 2015.

(51) Int. Cl.
*H04N 19/186* (2014.01)
*H04N 19/117* (2014.01)
(Continued)

(52) U.S. Cl.
CPC ........... *H04N 19/186* (2014.11); *H04N 9/646* (2013.01); *H04N 19/117* (2014.11);
(Continued)

(58) Field of Classification Search
CPC .. H04N 19/186; H04N 19/117; H04N 19/188; H04N 9/646; H04N 19/157; H04N 19/85; H04N 19/70
(Continued)

(56) References Cited

U.S. PATENT DOCUMENTS 9,781,417 B2 * 10/2017 Ninan .................. H04N 19/647
2004/0190631 A1 * 9/2004 Hulmani .................. H04N 7/52
375/240.26
(Continued)

FOREIGN PATENT DOCUMENTS

WO       2014/204865 A1    12/2014

OTHER PUBLICATIONS

Core Experiment 2 on HDR reconstruction approaches by E. Francois, W. Husak, Y. Ye, R. Goris (coordinators), ISO/IEC JTC1/SC29/WG11 N15456, Jun. 2015, Warsaw, PL.*
(Continued)

*Primary Examiner* — Tung T Vo
(74) *Attorney, Agent, or Firm* — Condo Roccia Koptiw LLP

(57) ABSTRACT

A high dynamic range (HDR) signal processing device may receive a video signal and an operating mode indication. The operating mode indication may indicate a format of the video signal, for example, an HDR format or a non-DR format. Whether to perform adaptive reshaping on the video signal may be determined based on the operating mode indication. For example, it may be determined to perform the adaptive reshaping if the operating mode indicates that the video signal is in an HDR format. It may be determined to bypass the adaptive reshaping if the operating mode indicates that the video signal is in the non-HDR format. Multiple types of HDR reconstruction metadata may be received via a network abstraction layer (NAL) unit.

27 Claims, 22 Drawing Sheets

(51) Int. Cl.
*H04N 19/157* (2014.01)
*H04N 19/85* (2014.01)
*H04N 19/70* (2014.01)
*H04N 19/169* (2014.01)
*H04N 9/64* (2006.01)

(52) U.S. Cl.
CPC ......... *H04N 19/157* (2014.11); *H04N 19/188* (2014.11); *H04N 19/70* (2014.11); *H04N 19/85* (2014.11)

(58) Field of Classification Search
USPC .......................................... 375/240.26, 240.2
See application file for complete search history.

(56) References Cited

U.S. PATENT DOCUMENTS

| | | | | |
|---|---|---|---|---|
| 2008/0193032 | A1* | 8/2008 | Segall ................... | H04N 19/176 382/251 |
| 2010/0172411 | A1* | 7/2010 | Efremov .............. | H04N 19/136 375/240.12 |
| 2011/0194618 | A1* | 8/2011 | Gish ......................... | G06T 5/50 375/240.25 |
| 2014/0037206 | A1 | 2/2014 | Newton et al. | |
| 2014/0092999 | A1 | 4/2014 | Dong et al. | |
| 2014/0327822 | A1 | 11/2014 | Gish et al. | |
| 2015/0237322 | A1* | 8/2015 | Stec ......................... | H04N 9/77 348/453 |
| 2015/0245044 | A1* | 8/2015 | Guo ....................... | H04N 19/98 375/240.03 |
| 2016/0005153 | A1 | 1/2016 | Atkins et al. | |
| 2016/0328830 | A1* | 11/2016 | Pouli ........................ | H04N 5/57 |
| 2016/0353123 | A1* | 12/2016 | Ninan ................... | H04N 5/2355 |
| 2017/0064334 | A1* | 3/2017 | Minoo .................... | H04N 19/60 |
| 2017/0251211 | A1* | 8/2017 | Froehlich ................. | H04N 9/67 |
| 2017/0374313 | A1* | 12/2017 | Oh .......................... | H04N 7/015 |
| 2018/0007363 | A1* | 1/2018 | Oh .......................... | H04N 19/10 |
| 2018/0007423 | A1* | 1/2018 | Tsukagoshi ........ | H04N 21/4356 |
| 2018/0020128 | A1* | 1/2018 | Tsukagoshi ............ | H04N 5/202 |
| 2018/0020224 | A1* | 1/2018 | Su ........................... | H04N 19/30 |
| 2018/0352257 | A1* | 12/2018 | Leleannec .............. | H04N 19/30 |

OTHER PUBLICATIONS

Andrivon et al., "Colour Remapping Information SEI Message for AVC", Technicolor, ISO/IEC JTC1/SC29/WG11 MPEG2015/M36521, Warsaw, Poland, Jul. 2015, 11 pages.
Baylon et al., "Response to Call for Evidence for HDR and WCG Video Coding: Arris, Dolby and InterDigital", Arris Inc., Dolby Laboratories Inc. and InterDigital Communications, LLC, ISO/IEC JTC1/SC29/WG11 MPEG2015/M36264, Warsaw, Poland, Jun. 2015, 9 pages.
Bordes et al., "AHG14: Color Gamut Scalable Video Coding Using 3D LUT", JCTVC-M0197, Technicolor, Joint Collaborative Team on Video Coding (JCT-VC) of ITU-T SG 16 WP 3 and ISO/IEC JTC1/SC 29/WG11, 13th Meeting: Incheon, KR, Apr. 18-26, 2013, pp. 1-10.
Boyce et al., "Draft High Efficiency Video Coding (HEVC) Version 2, Combined Format Range Extensions (RExt), Scalability (SHVC), and Multi-View (MV-HEVC) Extensions", JCTVC-R1013_v1, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 382 pages.
SMPTE, "Derivation of Basic Television Color Equations", RP 177-1993 Reaffirmed 2002, Society of Motion Picture and Television Engineers, NY, US, Nov. 1, 1993, 5 pages.
Ebrahimi et al., "Description of Subjective Evaluation for Evidence (CfE) for HDR and WCG Video Coding", AHG on HDR and WCG, ISO/IEC JTC1/SC29/WG11 MPEG2014/M35481, Geneva, Switzerland, Feb. 2015, 3 pages.

EXR, "OpenEXR", Available on internet http://www.openexr.com/, retrieved on Oct. 9, 2017, pp. 1-9.
Ferwerda, James A., "Elements of Early Vision for Computer Graphics", IEEE Computer Graphics and Applications, vol. 21, No. 5, Oct. 2001, pp. 22-33.
Fogg, Chad, "Output Code Map SEI", JCTVC-T0102, Motion Picture Laboratories Inc., Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-4.
Francois et al., "Interim Report on the Anchors Generation in View of the CfE for HDR/WCG Video Coding", Technicolor, Dolby, Arris, B-Com, ETRI, Qualcomm, Samsung, Sony, Sharp, ISO/IEC JTC1/SC29/WG11 MPEG2014/M35467, Geneva, Switzerland, Feb. 2015, 6 pages.
Goris et al., "Parameter Based Compatible HDR Proposal", Philips, ISO/IEC JTC1/SC29/WG11 MPEG2014/M35067, Strasbourg, France, Oct. 2014, 4 pages.
Goris et al., "Philips Response to CfE for HDR and WCG", Philips, ISO/IEC JTC1/SC29/WG11 MPEG2015/M36266, Warsaw, Poland, Jul. 2015, 16 pages.
Hanhart et al., "HDR CfE Subjective Evaluations at EPFL", Multimedia Signal Processing Group (MMSPG), Lausanne, Switzerland, Jun. 2015, pp. 1-10.
ISO/IEC, "Information Technology- Coding of Audio-Visual Objects-Part 2: Visual", ISO/IEC 14496-2, Dec. 1, 2001, 536 pages.
ISO/IEC, "Information Technology—Coding of Moving Pictures and Associated Audio for Digital Storage Media at Up to About 1,5 Mbit/s—Part 2: Video", ISO/IEC 11172-2:1993, Technical Corrigendum 3, Nov. 1, 2003, pp. 1-6.
ISO/IES, "Information Technology—Generic Coding of Moving Pictures and Associated Audio Information: Video", ISO/IEC 13818-2, Dec. 15, 2000, 220 pages.
ITU, "Codec for Audiovisual Services AT n x 384 kbit/s", H.261, Series H: Audiovisual and Multimedia Systems: Coding of Moving Video, Nov. 1988, 14 pages.
ITU-R, "Parameter Values for the HDTV Standards for Production and International Programme Exchange", Recommendation ITU-R BT.709-6, Jun. 2015, 19 pages.
ITU-R, "Parameter Values for Ultra-High Definition Television Systems for Production and International Programme Exchange", Recommendation ITU-R BT.2020, BT Series, Broadcasting Service (Television), Aug. 2012, 7 pages.
ITU-R, "Reference Electro-Optical Transfer Function for Flat Panel Displays used in HDTV Studio Production", Recommendation ITU-R BT.1886, BT Series, Broadcasting Service (Television), Mar. 2011, 7 pages.
ITU-T, "Advanced Video Coding for Generic Audiovisual Services", Series H: Audiovisual and Multimedia Systems: Infrastructure of Audiovisual Services- Coding of Moving Video, ITU-T Recommendation H.264, Nov. 2007, 563 pages.
ITU-T, "Video Coding for Low Bit Rate Communication", Series H: Audiovisual and Multimedia Systems: Infrastructure of Audiovisual Services- Coding of Moving Video, Recommendation H.263, Jan. 2005, 226 pages.
Laksono, Indra, "Hardware Implementation of HDR Video Decoding and Display System", ViXS Systems, ISO/IEC JTC1/SC29/WG11 MPEG2015/M36162, Geneva, Switzerland, Feb. 2015, 6 pages.
Lasserre et al., "High Dynamic Range Video Coding", JCTVC-P0159, Technicolor, Joint Collaborative Team on Video Coding (JCT-VC) of ITU-T SG 16 WP 3 and ISO/IEC JTC 1/SC 29/WG 11,16th Meeting: San José, US, Jan. 9-17, 2014, pp. 1-9.
Lasserre et al., "Technicolor's Response to CfE for HDR and WCG (Category 1)—Single Layer HDR Video Coding with SDR Backward Compatibility", Technicolor, ISO/IEC JTC1/SC29/WG11 MPEG2014/ M36263r1, Warsaw, Poland, Jun. 2015, 21 pages.
Léannec et al., "Modulation Channel Information SEI Message", JCTVC-R0139r2, Technicolor, Joint Collaborative Team on Video Coding (JCT-VC) of ITU-T SG 16 WP 3 and ISO/IEC Jtc 1/SC 29/WG 11, 18th Meeting: Sapporo, JP, Jun. 30-Jul. 9, 2014, pp. 1-13.
Léannec et al., "Usage of Modulation Channel for High Bit-Depth and Floating Point Signal Encoding", JCTVC-R0267, Technicolor,

(56) References Cited

OTHER PUBLICATIONS

Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-12.

Luthra et al., "Call for 1000 and 4000 nits Peak Brightness Test Material for HDR and WCG Video Coding", ISO/IEC JTC1/SC29/WG11 MPEG2014/N15099, Geneva, Switzerland, Feb. 2015, 2 pages.

Luthra et al., "Call for Evidence (CfE) for HDR and WCG Video Coding", ISO/IEC JTC1/SC29/WG11 MPEG2014/N15083, Geneva, Switzerland, Feb. 2015, 46 pages.

Luthra et al., "Requirements and Use Cases for HDR and WCG Content Coding", ISO/IEC JTC1/SC29/VVG11 MPEG2014/N15084, Geneva, Switzerland, Feb. 2015, 13 pages.

Luthra et al., "Use Cases of the Scalable Enhancement of HEVC", WG11 Requirements and Video, ISO/IEC JTC1/SC29/WG11 N12955, Stockholm, Sweden, Jul. 2012, 8 pages.

Mantiuk et al., "HDR-VDP-2: A Calibrated Visual Metric for Visibility and Quality Predictions in all Luminance Conditions", ACM Transactions on Graphics (TOG), vol. 30, No. 4, Jul. 2011, 13 pages.

Minoo et al., "Description of the Exploratory Test Model (ETM) for HDR/WCG Extension of HEVC", JCTVC-W0092, Arris, Dolby, InterDigital, Qualcomm, Technicolor, Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, pp. 1-4.

Minoo et al., "Draft of the Test Model for HDR extension of HEVC", Arris, Dolby Laboratories Inc., InterDigital Communications, LLC, Philips, Qualcomm and Technicolor, ISO/IEC JTC1/SC29/WG11 MPEG2014/ m37479, Geneva, CH, Oct. 2015, 5 pages.

ISO/IEC, "Report of AHG on HDR and WCG", ISO/IEC JTC1/SC29/WG11 M34603, Strasbourg, FR, Oct. 2014, 5 pages.

Sharma et al., "The CIEDE2000 Color-Difference Formula: Implementation Notes, Supplementary Test Data, and Mathematical Observations", Color Research & Applications, vol. 30, No. 1, Feb. 2005, pp. 21-30.

Sheikh et al., "Image Information and Visual Quality", IEEE Transactions on Image Processing, vol. 15, No. 2, Feb. 2006, pp. 430-444.

Smolic, Aljosa, "Informative Input on Temporally Coherent Local Tone Mapping of HDR Video", Disney Research Zurich, ISO/IEC JTC1/SC29/WG11 MPEG2014/M35479, Geneva, Switzerland, Feb. 2015, 1 page.

SMPTE, "High Dynamic Range Electro-Optical Transfer Function of Mastering Reference Displays", SMPTE ST 2084:2014, Aug. 16, 2014, pp. 1-14.

SMPTE, "Mastering Display Color vol. Metadata Supporting High Luminance and Wide Color Gamut Images", SMPTE ST 2086:2014, Oct. 13, 2014, pp. 1-6.

Stessen et al., "Chromaticity Based Color Signals", Philips, ISO/IEC JTC1/SC29/WG11 MPEG2014/M34335, Sapporo, Japan, Jul. 2014, 16 pages.

Tourapis et al., "Exploration Experiment 3 on Objective Test Methods for HDR and WCG Video Coding Evaluation", ISO/IEC JTC1/SC29/WG11 MPEG2014/M35478, Geneva, Switzerland, Feb. 2015, 5 pages.

Tourapis et al., "HDRTools: Software Updates", Apple Inc., ISO/IEC JTC1/SC29/WG11 MPEG2014/M35471, MPEG HDR/WCG AHG Meeting, Lausanne, Switzerland, Dec. 2014, 2 pages.

Wikipedia, "Half-Precision Floating-Point Format", Available online at http://en.wikipedia.org/wiki/Half-precision floating-point format, retrieved on Oct. 12, 2017, 5 pages.

Yin et al., "Candidate Test Model for HDR extension of HEVC", Dolby Laboratories Inc. and InterDigital Communications, LLC, ISO/IEC JTC1/SC29/WG11 MPEG2014/ m37269, Geneva, CH, Oct. 2015, 6 pages.

Yin et al., "Common Technologies and Architectures for HDR Coding", Video Subgroup, ISO/IEC JTC1/SC29/WG11 N15454, Warsaw, PL, Jun. 2015, 7 pages.

* cited by examiner

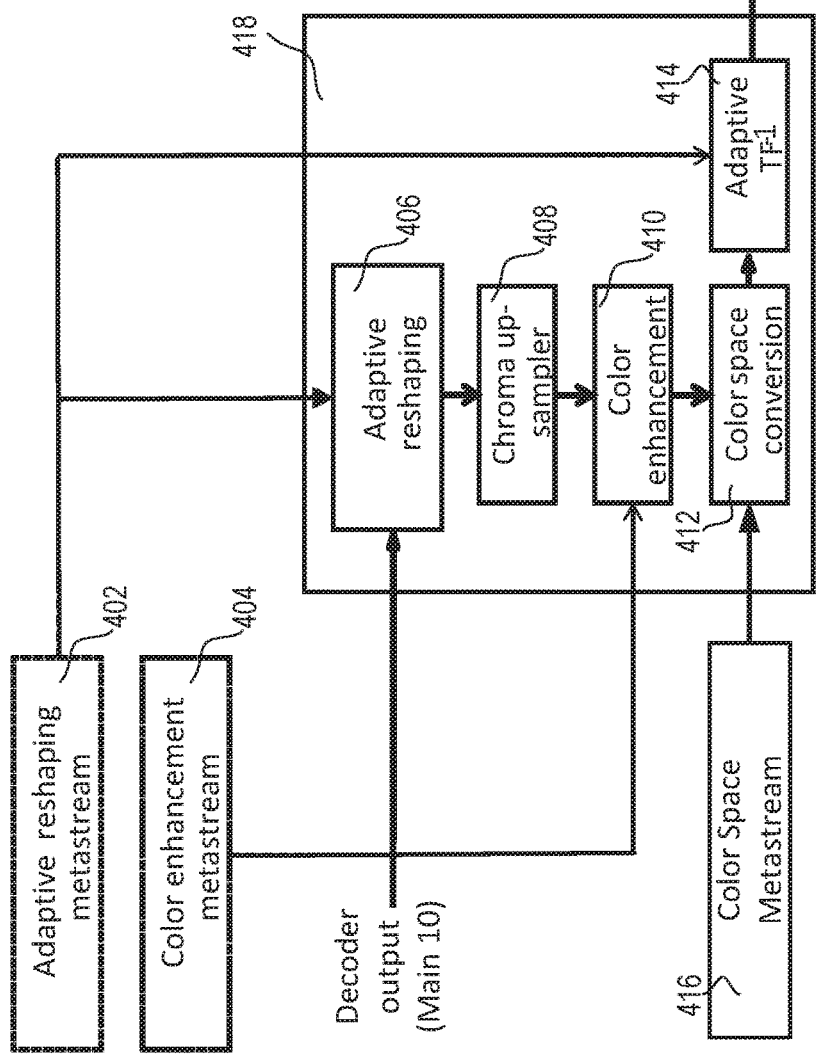
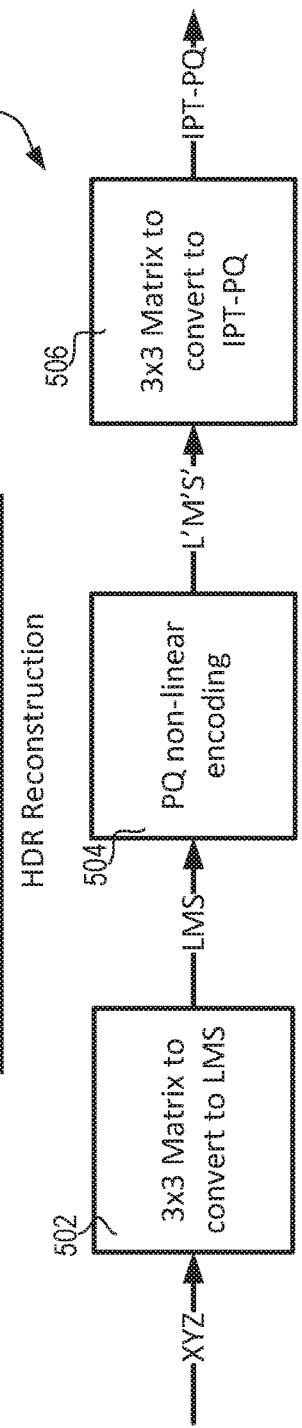
FIG. 4
FIG. 5

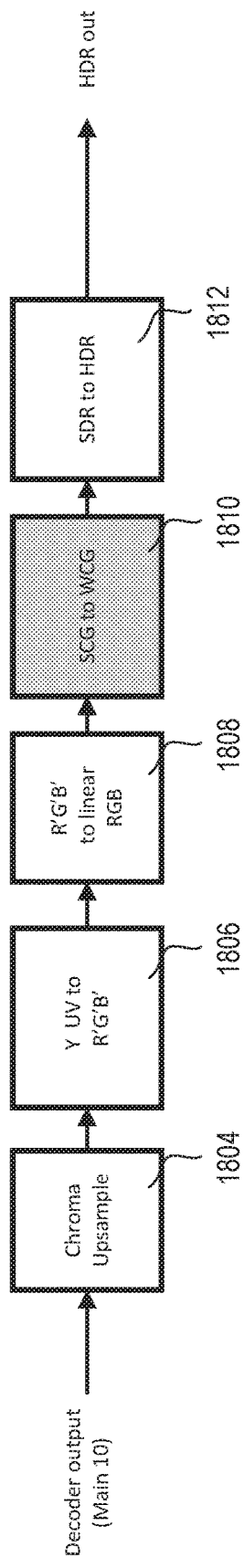
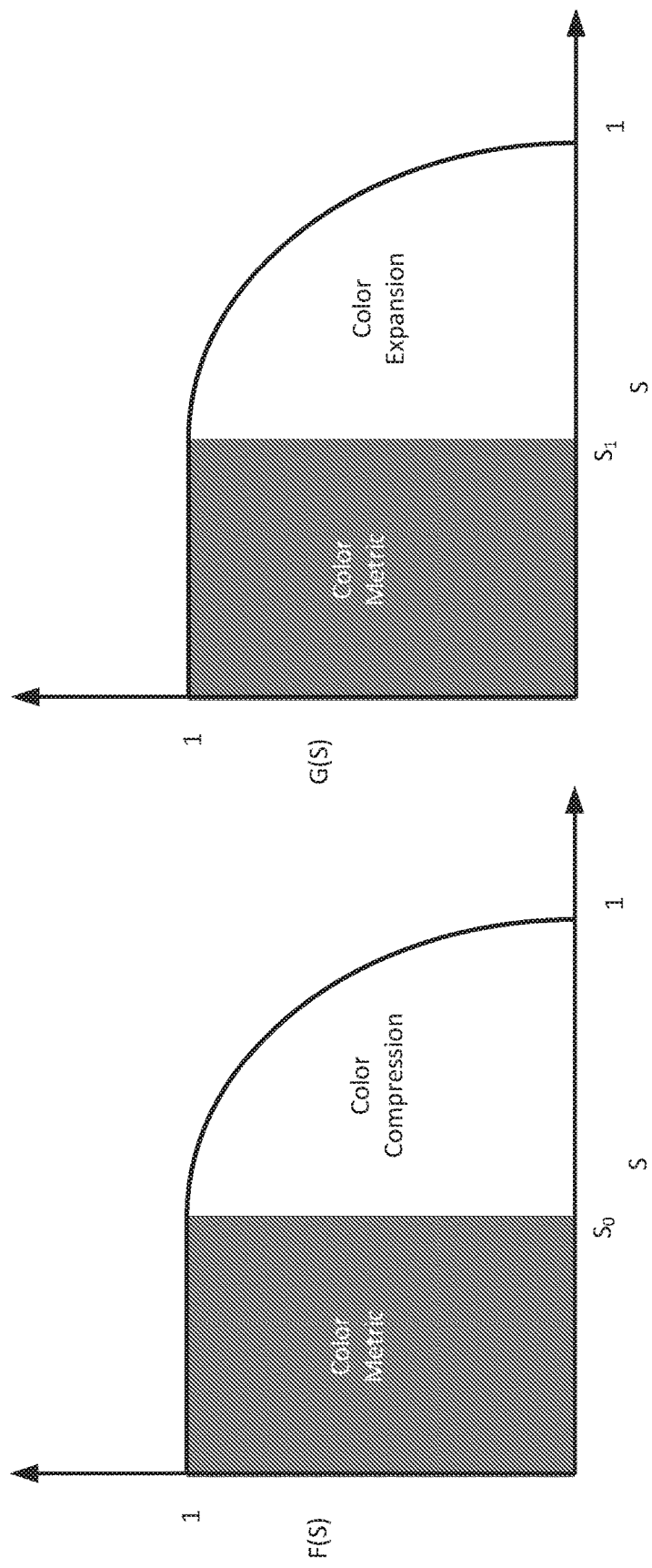
FIG. 18
FIG. 22
FIG. 21

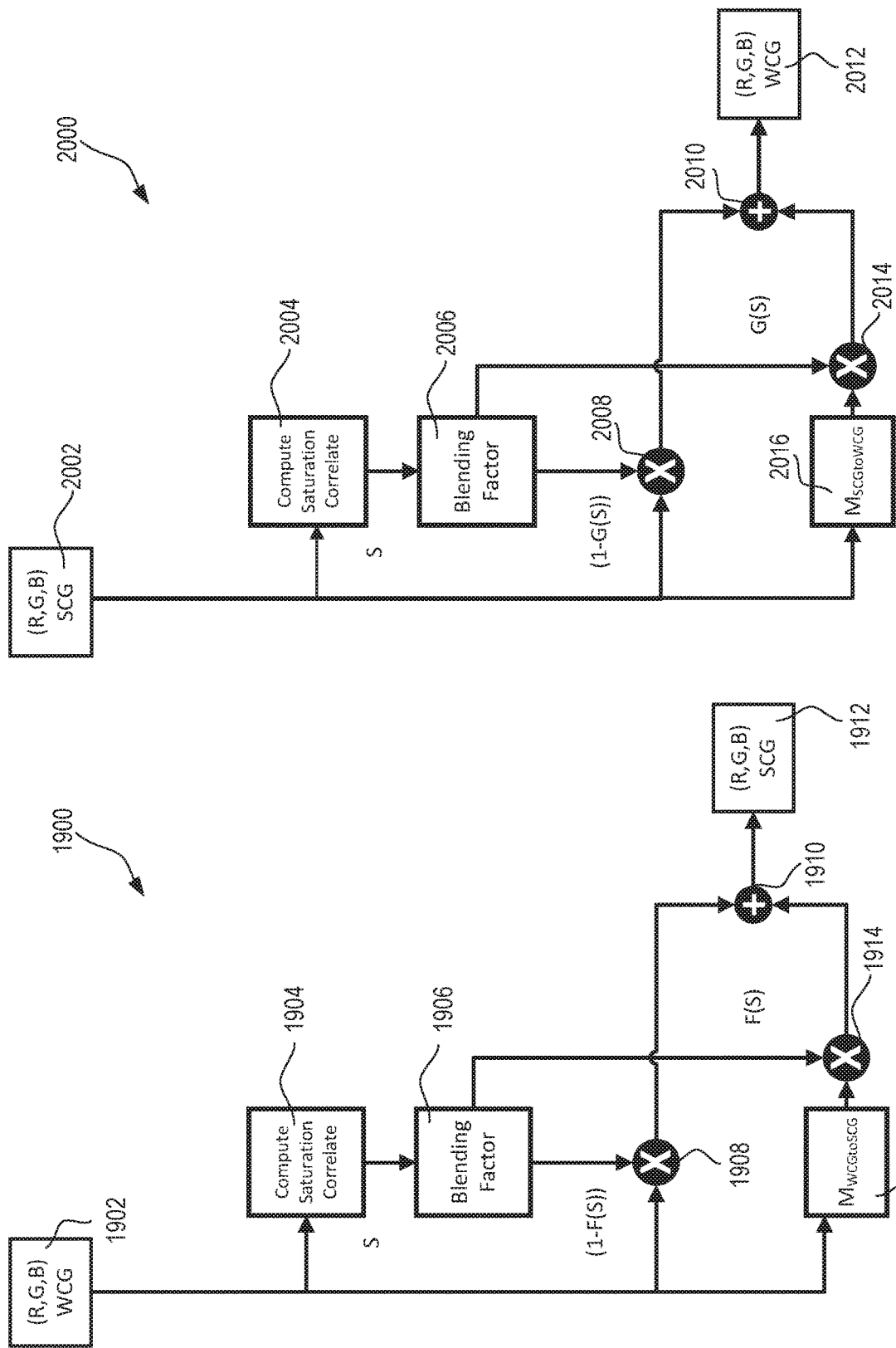

HIGH DYNAMIC RANGE VIDEO CODING ARCHITECTURES WITH MULTIPLE OPERATING MODES

CROSS-REFERENCE TO RELATED APPLICATION

This application is the National Stage Entry under 35 U.S.C. § 371 of Patent Cooperation Treaty Application No. PCT/US2016/044354, filed Jul. 28, 2016, which claims the benefit of U.S. Provisional Patent Application No. 62/198,089, filed Jul. 28, 2015, the contents of which are incorporated by reference herein.

BACKGROUND

A variety of digital video compression technologies enable efficient digital video communication, distribution, and consumption. Some examples of standardized video compression technologies are H.261, Motion Picture Experts Group (MPEG)-1, MPEG-2, H.263, MPEG-4 part2, and H.264/MPEG-4 part 10 advanced video coding (AVC). Advanced video compression technologies, such as high efficiency video coding (HEVC), may provide greater compression and lesser bitrate while keeping the same video quality as what H.264/AVC may offer.

SUMMARY

A high dynamic range (HDR) signal processing device may receive a video signal and an operating mode indication. The operating mode indication may indicate a format of the video signal, for example, an HDR format or a non-HDR format. Whether to perform adaptive reshaping on the video signal may be determined based on the operating mode indication. For example, it may be determined to perform the adaptive reshaping if the operating mode indicates that the video signal is in an HDR format. It may be determined to bypass the adaptive reshaping if the operating mode indicates that the video signal is in a non-HDR format. Multiple types of HDR reconstruction metadata may be received via a network abstraction layer (NAL) unit. The metadata with HDR reconstruction may be processed with a high priority. Adaptive reshaping metadata may be retrieved from the HDR reconstruction metadata and be used to perform the adaptive reshaping.

HDR video coding may be provided, for example, by providing multi-mode pre and/or post encoding or decoding processing dependent upon an operating mode, e.g., an HDR operating mode and a standard dynamic range (SDR) compatible operating mode. For example, when operating in the HDR operating mode, functions such as adaptive reshaping, chroma upsampling, color enhancement, color space conversion and adaptive transfer function (ATF)/electro-optical transfer function (EOTF) may be performed, and functions such as scaling factor derivation, color gamut mapping, and dynamic range conversion may be bypassed. When operating in SDR compatible operating mode, functions such as scaling factor derivation, color gamut mapping, dynamic range conversion, chroma upsampling, color enhancement, color space conversion, and ATF/EOTF may be performed, and functions such as adaptive reshaping may be bypassed.

BRIEF DESCRIPTION OF THE DRAWINGS

FIG. 4 shows an example of a post-processing HDR reconstruction process.

FIG. 5 shows an example of XYZ to IPT-PQ color space conversion.

FIG. 18 shows an example of color gamut mapping with SDR to HDR conversion.

FIG. 19 shows an example of wide color gamut (WCG) to standard color gamut (SCG) mapping.

FIG. 20 shows an example of SCG to WCG mapping.

FIG. 21 shows an example of encoder side blending factor calculation.

FIG. 22 shows an example of decoder side blending factor calculation.

DETAILED DESCRIPTION

Figure 1:
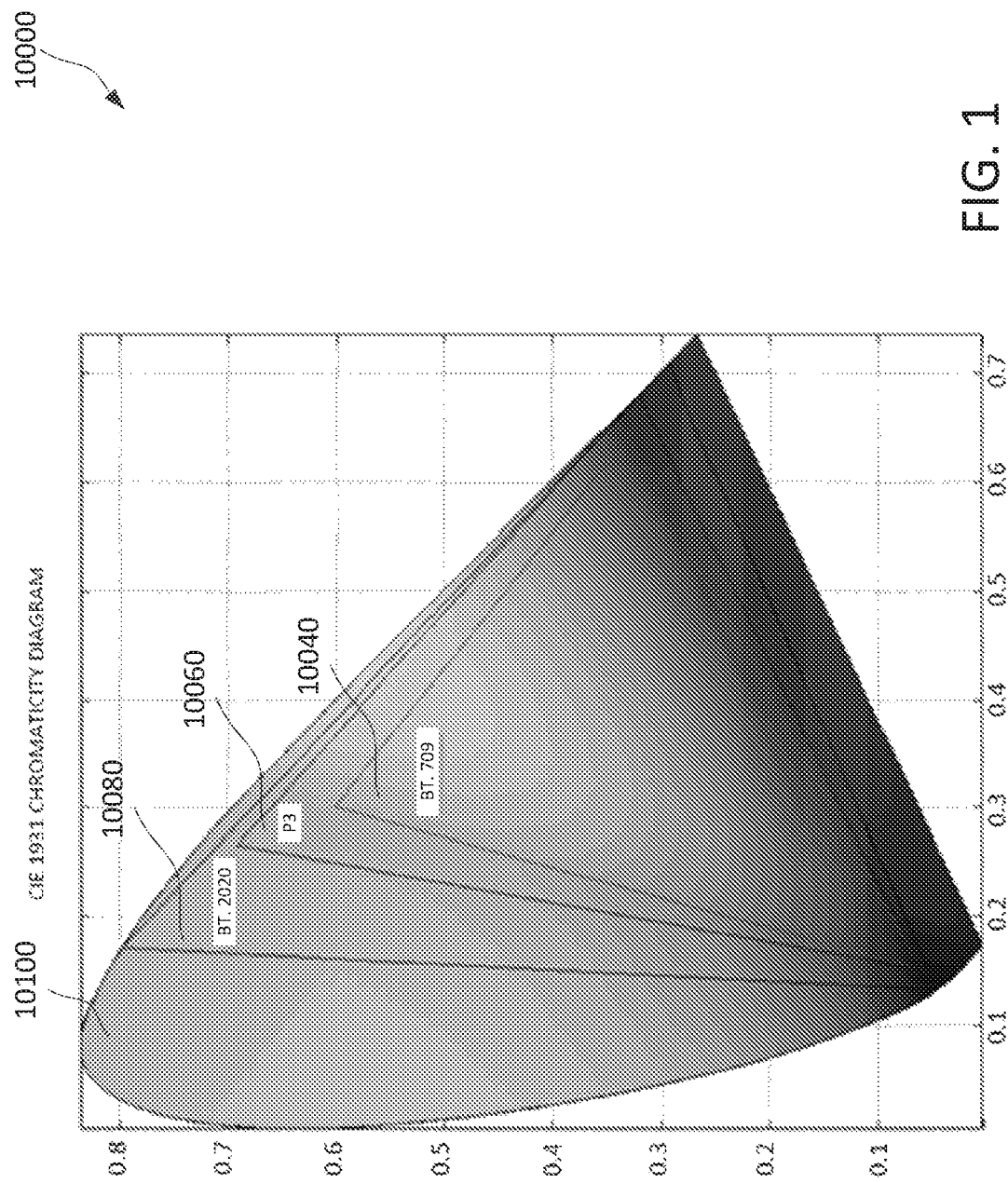
FIG. 1 shows an example comparison of ultra high definition television (UHDTV), HDTV and P3 (DC) color primaries in International Commission on Illumination (CIE) space.

A detailed description of illustrative embodiments will now be described with reference to the various figures. Although this description provides a detailed example of possible implementations, it should be noted that the details are intended to be exemplary and in no way limit the scope of the application.

Digital video services may comprise, for example, TV services over satellite, cable, and/or terrestrial broadcasting channels. Mobile devices, e.g., smart phones and tablets, may run video applications, e.g., video chat, mobile video recording and sharing, and video streaming. Videos may be transmitted in heterogeneous environments, e.g., over the Internet. Transmission scenarios known as 3-screen and N-screen contemplate video consumption on devices (e.g., personal computers (PCs), smart phones, tablets, TVs) with varying capabilities (e.g., computing power, memory/storage size, display resolution, display frame rate, display color gamut, and/or the like). Network and transmission channels may have varying characteristics (e.g., packet loss rate, available channel bandwidth, burst error rate, and/or the like). Video data may be transmitted over a combination of wired networks and wireless networks, which may complicate underlying transmission channel characteristics. Scalable video coding may improve the quality of experience for video applications running on devices with different capabilities over heterogeneous networks. Scalable video coding may encode a signal at a high representation (e.g., in terms of temporal resolution, spatial resolution, and quality) and may permit decoding subsets of video streams dependent on rates and/or representations that are utilized by applications running on various client devices. Scalable video coding may save backbone network bandwidth and/or storage relative to non-scalable solutions. Video standards, e.g., MPEG-2 video, H.263, MPEG4 video, and H.264, may provide tools and/or profiles that support modes of scalability.

Table 1 compares example video format definitions for high definition TV (HDTV) video formats and Ultra High Definition TV (UHDTV) applications. As shown in Table 1, UHDTV may support larger spatial resolution (e.g., 4K×2K (3840×2160) and 8K×4K (7680×4320) resolutions), higher frame-rate (e.g., 120 Hz), higher sample bit depth (e.g., 10 bits or 12 bits) and wider color gamut than HDTV does. A video signal of higher fidelity provided by UHDTV may improve viewer experience. P3 color gamut may be used in digital cinema applications. ITU-R in Table 1 stands for international telecommunication union (ITU) radiocommunication sector (ITU-R).

TABLE 1 comparison of example HDTV and UHDTV technical specifications

| | | High Definition | Ultra High Definition |
|---|---|---|---|
| ITU-R BT series | | BT.709-5 (part 2) | BT.2020 |
| Spatial resolution | | 1920 × 1080 | 7680 × 4320, 3840 × 2160 |
| Temporal | Frame rate | 60, 50, 30, 25, 24 | 120, 60, 50, 30, 25, 24 |
| | Scan | Progressive, interlaced | Progressive |
| Primary colors | Red primary | (0.640, 0,300) | (0.708, 0.292) |
| | Green primary | (0.150, 0,330) | (0.170, 0.797) |
| | Blue primary | (0.600, 0.060) | (0.131, 0.046) |
| | White point | (0.3127, 0.3290) (D65) | |
| | Coding format | 8- and 10-bit | 10- and 12-bit |

FIG. 1 shows an example comparison of UHDTV, HDTV and P3 (DC) color primaries in CIE space. In FIG. 1, the HD color gamut 10040 is shown as the inner triangle, the UHD color gamut 10080 is shown as the outer triangle, and the P3 color gamut 10060 is shown as the middle triangle overlaid with the CIE 1931 color space chromaticity diagram 10100 shown as a horseshoe shape. The horseshoe shape represents a range of colors visible to human eyes. The HD color gamut and the UHD color gamut cover approximately 36% and 76% of the CIE 1931 color space, respectively. A color volume that is reproduced on a UHD display may significantly increase the volume of reproducible colors such that more vivid, richer colors may be provided on the UHD display than color volume that may be reproduced on an HD display.

Viewing experience, e.g., in consumer electronics, may improve as video technology improves. Video technology improvements may include, for example, spatial resolution improvements from HD to UHD, frame rate improvements from 60 Hz to 100/120 Hz, stereoscopic/multi-view viewing experience, a wider color gamut, and high dynamic range (HDR). An HDR video parameter may be defined as a ratio between the minimum and maximum luminance perceived or captured in a real scene or a rendering device. HDR may be measured in terms of "f-stop" (or "f-number"), where one f-stop corresponds to a doubling of signal dynamic range. Luminance may be measured in candela (cd) per m$^2$ (e.g., nits). As an example, in natural scenes, sunlight may be approximately 6×10$^8$ nits, and blue sky in the morning may be 4600 nits while night sky may be 0.005 nits or lower, which amounts to a dynamic range of approximately 100 million (e.g., 37 f-stops). In a room, the sky visible through a window may be approximately 10,000 nits, a human face may be 50 nits, and a dark surface may be approximately 1 nit. Human vision may adapt to capture light below starlight or above sunlight, which corresponds to lighting conditions that vary by nearly 10 orders of magnitude. A consumer display may support 100 nits peak luminance, which is lower than the dynamic range of natural scenes that may be perceived by human vision.

Video distribution environments that provide SDR contents may support a range of brightness from 0.1 to a few hundred nits, leading to a dynamic range less than 10 f-stops. Studies have shown that HDR displays (e.g., with a peak luminance of 1000 to 4000 nits) may provide significant perceptual quality benefits comparing to SDR displays. HDR and WCG may expand the limits of artistic intent expression. Some cameras (e.g., Red Epic Dragon, Sony F55/F65, ARRI Alexa XT) may be able to capture HDR video (e.g., to 14 f-stops).

An interoperable HDR/WCG service delivery chain, including capturing, preprocessing, compression, post-processing and display, may support video delivery. In MPEG HDR and WCG content distribution and storage, HDR may correspond to more than 16 f-stops. Levels between 10 and 16 f-stops may be considered as intermediate or extended dynamic range, which is a range that is significantly smaller than the range encountered in real life. Levels between 10 and 16 f-stops are far from the capabilities of the human vision system. HDR videos may offer a wider dynamic range closer to the capacities of human vision. Native (uncompressed, raw) test sequences may, for example, cover HD and P3 color gamuts, may be stored in HD and UHD containers, and may have a file format of EXR or TIFF.

Figure 2:
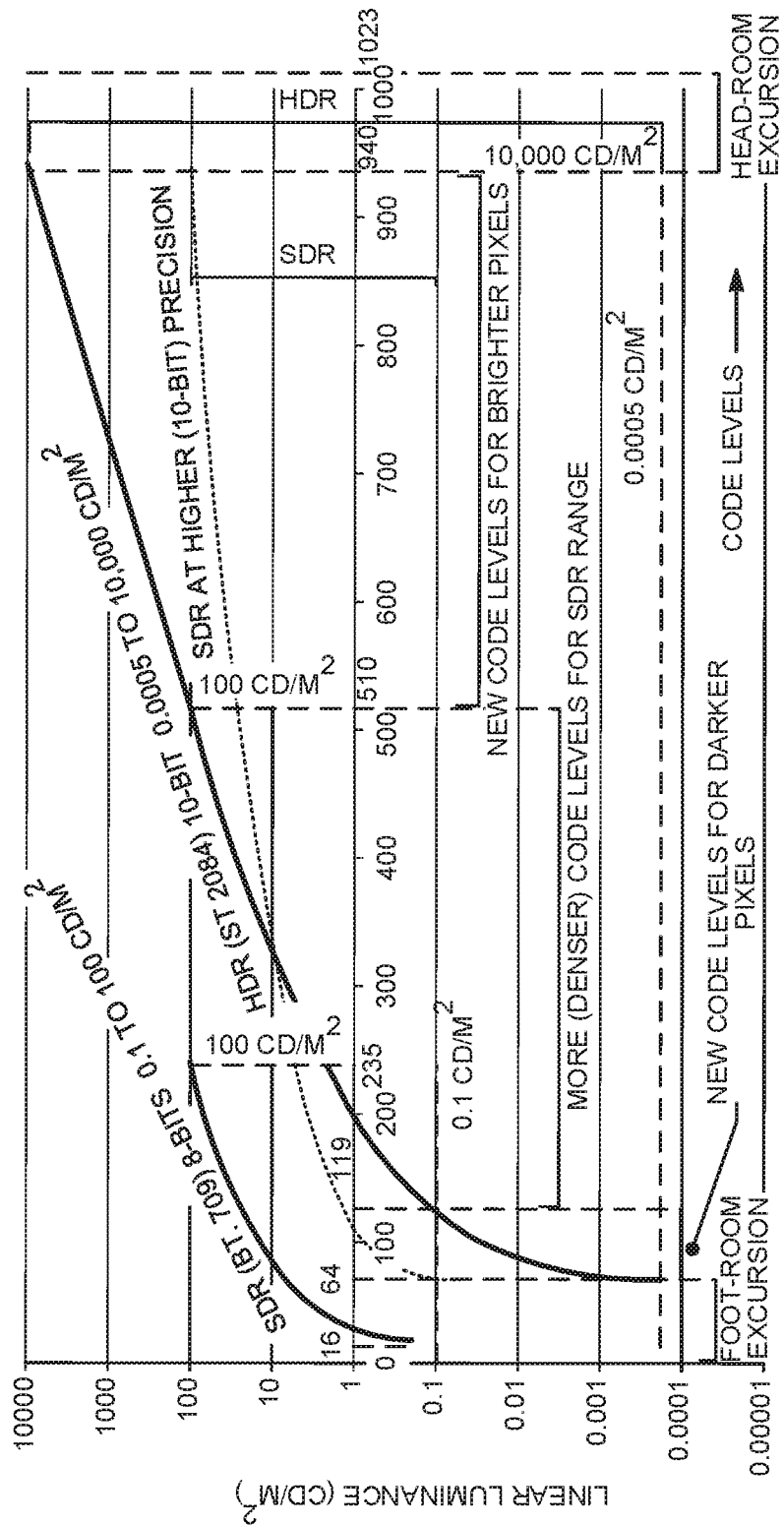
FIG. 2 shows an example mapping of linear light values for standard dynamic range (SDR) and high dynamic range (HDR) representations.

FIG. 2 shows an example mapping of linear light values for SDR and HDR representations. A peak luminance of a test sequence may be approximately 4000 nits. An example of a transfer function (TF) that may be used to convert a linear signal to a non-linear signal for compression may be a perceptual quantizer (PQ) as shown in FIG. 2, for example in comparison to a gamma function.

Objective quality evaluation for HDR compression may be more complex than SDR. There may be many different types of distortion in HDR compressed videos, such as color bleeding and color banding, in addition to blurring, blocking, and ringing artifacts. Artifacts may be more visible with a bright background. The following metrics may be considered for objective quality evaluation in HDR and WCG: peak signal to noise ratio (PSNR) in XYZ with the transfer function referred as tPSNR. PSNR evaluation in linear RGB (e.g., with gamma equal to 2.2) referred as mPSNR, PSNR of the mean absolute value of the deltaE2000 metric referred as PSNR_DE2000, visual difference predictor (VDP2), visual information fidelity (VIF), and structural similarity (SSIM).

Subjective quality evaluation for HDR may comprise a side by side viewing comparison between cropped videos of a test technique and cropped original videos. HDR display may be calibrated (e.g., peak brightness, display uniformity). There may be multiple kinds of HDR displays in subjective quality evaluation, e.g., SIM2 and Pulsar. A viewer may focus on different areas, for example, because there are more details in HDR video compared to SDR, which may lead to variation among subjective quality evaluations. An HDR anchor may be generated with an HEVC main 10 profile and scalability extension of HEVC (SHVC) scale main 10 profile encoder. There may be multiple (e.g., three) categories in evaluating HDR techniques. Category 1 may consider coding technologies that offer compression efficiency improvements over an HEVC main 10 profile for HDR with HD or P3D65 color gamut content and normative changes. Category 2 may consider backward compatible solutions for HDR with HD or P3D65 content, for example, using layered or scalable solutions. Category 3 may consider optimization of the performance of a main 10 profile and/or scalable main 10 profile for HDR with HD or P3D65 color gamut content without normative changes.

Figure 3:
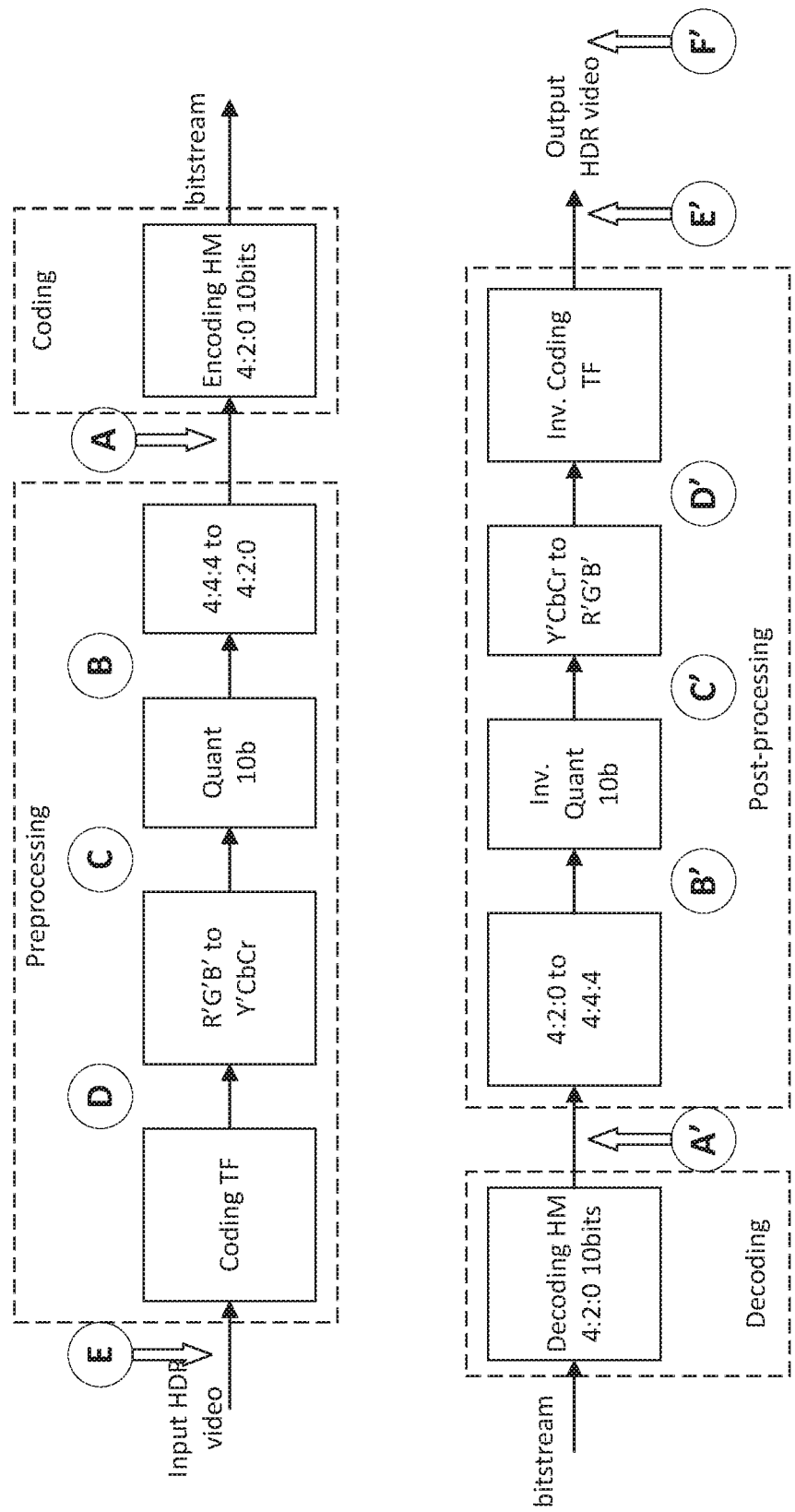
FIG. 3 shows an example of an end-to-end HDR coding and decoding chain.

FIG. 3 shows an example of an end to end HDR coding and decoding chain. An HDR coding/decoding workflow may, for example, be based on HEVC profiles with multiple types of processes, e.g., preprocessing, coding/decoding, and postprocessing. Preprocessing may convert a linear signal (e.g., linear floating point RGB) to a signal for compression (e.g., 10-bit YCbCr (A)), which may comprise linear to non-linear conversion with TF (e.g., linear RGB (E) to non-linear R'G'B'(D)), color space conversion (e.g., R'G'B'(D) to Y'CbCr (C)), floating point to fixed point conversion (e.g., quantizing sample value in floating point to 10-bit (B)) or chroma format conversion (e.g., chroma 4:4:4 to 4:2:0 (A)). Coding/decoding (compression/decompression) may comprise, for example, a single layer codec A' (e.g., HEVC main 10 scalable codec (e.g., SHVC scalable main 10 codec). Post-processing may convert a decompressed signal to a linear signal (e.g., linear floating point RGB (E')), which may comprise inverse chroma format conversion (chroma 4:2:0 to 4:4:4 (B')), inverse conversion from fixed point to floating point (e.g. 10-bit to floating point (C')), inverse color space conversion (e.g. Y'CbCr to R'G'B' (D')) or conversion from non-linear to linear with inverse TF.

HDR performance evaluation may be different from SDR performance evaluation workflow. With reference to an example shown in FIG. 3, an evaluation of HDR coding may be performed between E and E' at various bitrates while an evaluation of SDR coding may be performed between A and A'. Additional distortion may be introduced in processes before compression and after decompression. An HDR performance evaluation workflow may involve several format conversions (e.g., linear to non-linear, one color space to another, one chroma format to another, sample value range conversion). An objective quality metrics calculation (e.g. tPSNR, mPSNR, PSNR_DE2000) may be performed to take these processes into consideration. A conversion and metrics calculation tool may be provided, for example, to make a compression and evaluation process feasible. An objective metric calculation result may depend on the platform where it is executed, for example, when a floating point calculation is used. In an HDR workflow, some related information, such as the transfer function, color space, and tone mapping related information, may be signaled.

Table 2 is a list of example tools that may be related to HDR and WCG.

TABLE 2

Example tools related to HDR and WCG

| Metadata | Usage |
| --- | --- |
| Video signal type related syntax elements that may be indicated in video usability information (VUI) | "video_full_range_flag," "colour_primaries," "transfer_characteristics" and "matrix_coeffs" may indicate some properties of the coded video container including sample value range, color primaries, transfer function, and/or color space to map video sample code levels to display intensities. Camera log transfers and perceptual quantizer (PQ) (e.g. SMPTE ST 2084), among others, may be selected, for example, in addition to the HD combination that may be utilized by digital video disc (DVD), Advanced television systems committee (ATSC), digital video broadcasting (DVB) and Blu-ray 1.0. UHD primaries may be added to AVC, HEVC, and XYZ. |
| Tone mapping information supplemental enhancement information (SEI) message | SEI may provide information to enable remapping of color samples of output decoded pictures for customization to particular display environments. It may include multiple methods to transmit one or more curves compactly within the bit-stream. The one or more curves may each target a different mapping scenario. |
| Mastering display color volume SEI message | Mastering display color volume SEI message may signal brightness range, primaries, and white point of a display monitor used during grading of video content (e.g. SMPTE ST 2086). |
| Color remapping information SEI message | Color remapping information SEI message may provide information to enable remapping of reconstructed color samples of output pictures. |
| Knee function | Knee function information SEI message may provide information |

TABLE 2-continued

Example tools related to HDR and WCG

| Metadata | Usage |
| --- | --- |
| information SEI message | to enable mapping of color samples of decoded pictures for customization to various display environments. A knee function may include a piecewise linear function. |
| Color gamut scalability/bit depth scalability look-up table in picture parameter set | Color gamut scalability/bit depth scalability look-up table in picture parameter set may provide non-native color mapping between base layer and SHVC enhancement layer (e.g., HD base layer (BL) → UHD enhancement layer (EL)), for bit depth and color gamut scalability. |

FIG. 4 shows an example of a post-processing HDR reconstruction process, e.g., an HDR-only coding solution. An HDR reconstruction process corresponding to adaptive reshaping and transfer function (ARTF) may be performed in multiple functional blocks (e.g., 414 as shown in FIG. 4). The HDR reconstruction 418 may comprise adaptive reshaping 406, chroma up-sampling 408, color enhancement 410, color space conversion 412, and adaptive inverse TF 414. The adaptive inverse TF 414 may use adaptive reshaping metadata identified in adaptive reshaping metastream 402, and output HDR. The adaptive reshaping 406 may use the decoder output (e.g., main 10) and the adaptive reshaping metadata. Color enhancement 410 may use color enhancement metadata identified in color enhancement metastream 404. Color enhancement filters for a picture may be estimated, e.g., at the encoder side, and may be signaled as color enhancement metadata 404. An HDR reconstruction process may apply color enhancement filters that are signaled as color enhancement metadata, e.g., as shown in FIG. 4, to a reconstructed I component to enhance the P and T components. The color space conversion 412 may use color space metadata identified in color space metastream 416.

FIG. 5 shows an example of XYZ to IPT-PQ color space conversion. FIG. 5 shows a diagram of forward color space conversion (e.g., from XYZ to IPT-PQ). The process 500 may comprise matrix conversion to LMS (e.g., 3×3 matrix) 502, PQ non-linear encoding 504, and matrix conversion to IPT-PQ (e.g., 3×3 matrix) 506. A color space conversion process from IPT-PQ to XYZ may use reverse order of the blocks in FIG. 5. IPT-PQ colour space may be derived from a perception-based colour opponent model.

An ARTF (e.g., 406 and 414) may change signal characteristics. ARTF may provide adaptive codeword re-distribution, for example, based on pixel brightness and signal requantization. ARTF may provide signal re-quantization among I, P and T components. ARTF may be performed on a scene basis.

Figure 6:
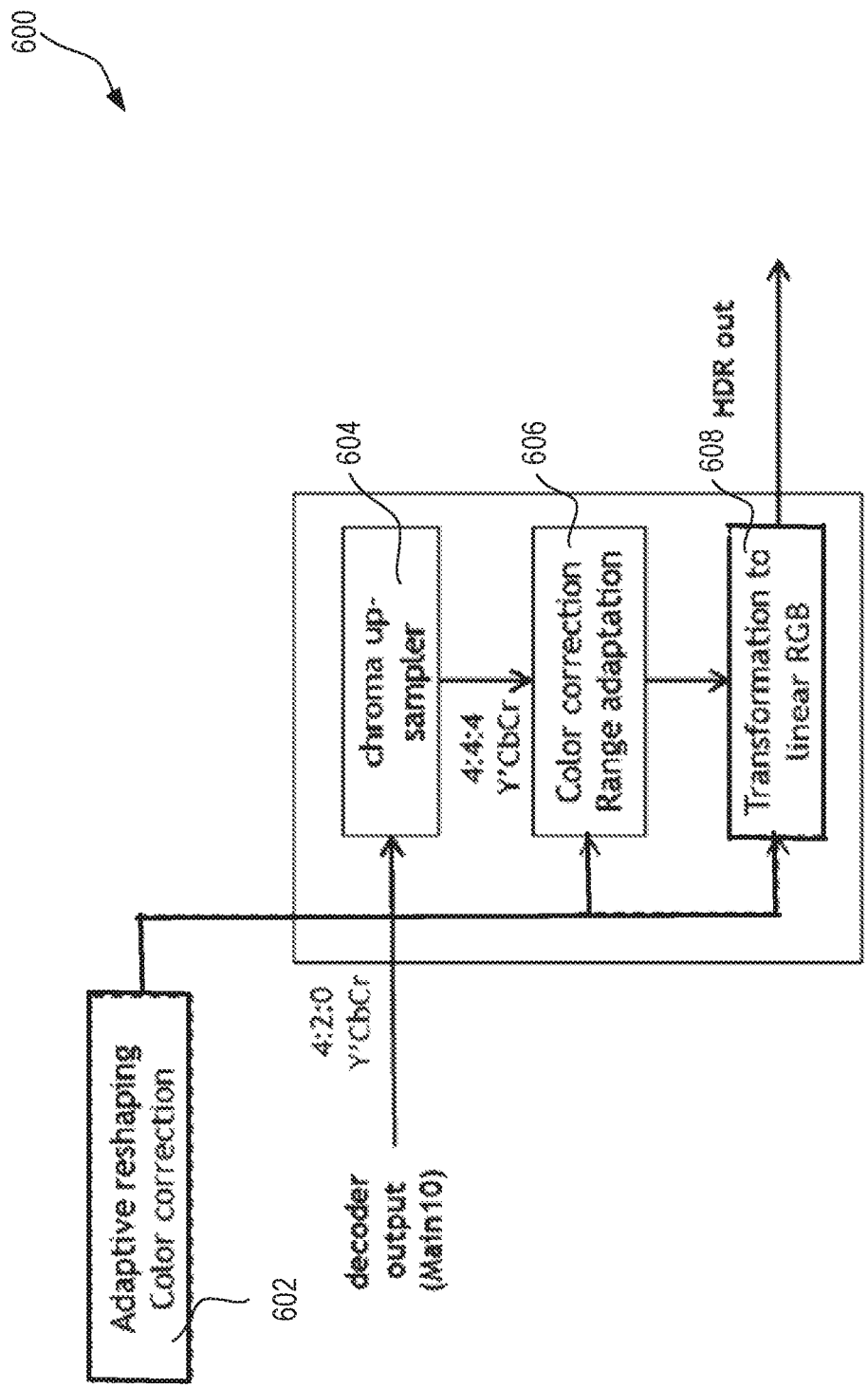
FIG. 6 shows an example of a single-layer SDR backward compatible structure.

FIG. 6 shows an example of a single-layer SDR backward compatible design. HEVC encoder input and HEVC decoder output may include a Y'CbCr SDR version of source HDR content, e.g., before compression and after decompression. A decompressed SDR version may be converted back to HDR via an HDR reconstruction process 600, e.g., at a decoder. As shown in FIG. 6, reconstructed SDR content from a decoder (e.g., main 10) may be upsampled, e.g., from 4:2:0 to 4:4:4, at 604. The 4:4:4 Y'CbCr may be processed, e.g., via colour correction and range adaptation at 606. Output of color correction and range adaption may be transformed to linear RGB at 608. A conversion to RGB linear light may be concatenated with conversion to output HDR format at 608. Colour correction and range adaptation 606 and the transformation to linear RGB 608 may be performed based on adaptive reshaping colour correction information 602.

Some techniques may have dynamic range adaptation to convert HDR to/from SDR, for example, by encoding SDR video directly and/or converting SDR back to HDR at the receiver side. Non-HDR clients, such as SDR client, and HDR clients may be supported, which may be referred to as backward compatibility. SDR to HDR conversion may be enhanced, e.g., with some signaled metadata information. Backward compatible processes may compromise quality of SDR video as it goes through compression and decompression. The SDR to HDR range conversion process at the decoder side may magnify the quality degradation in the SDR signal, which may become visible in displayed HDR video. A similar degradation problem may exist as the color gamut is expanded from SDR to HDR video.

Figure 7:
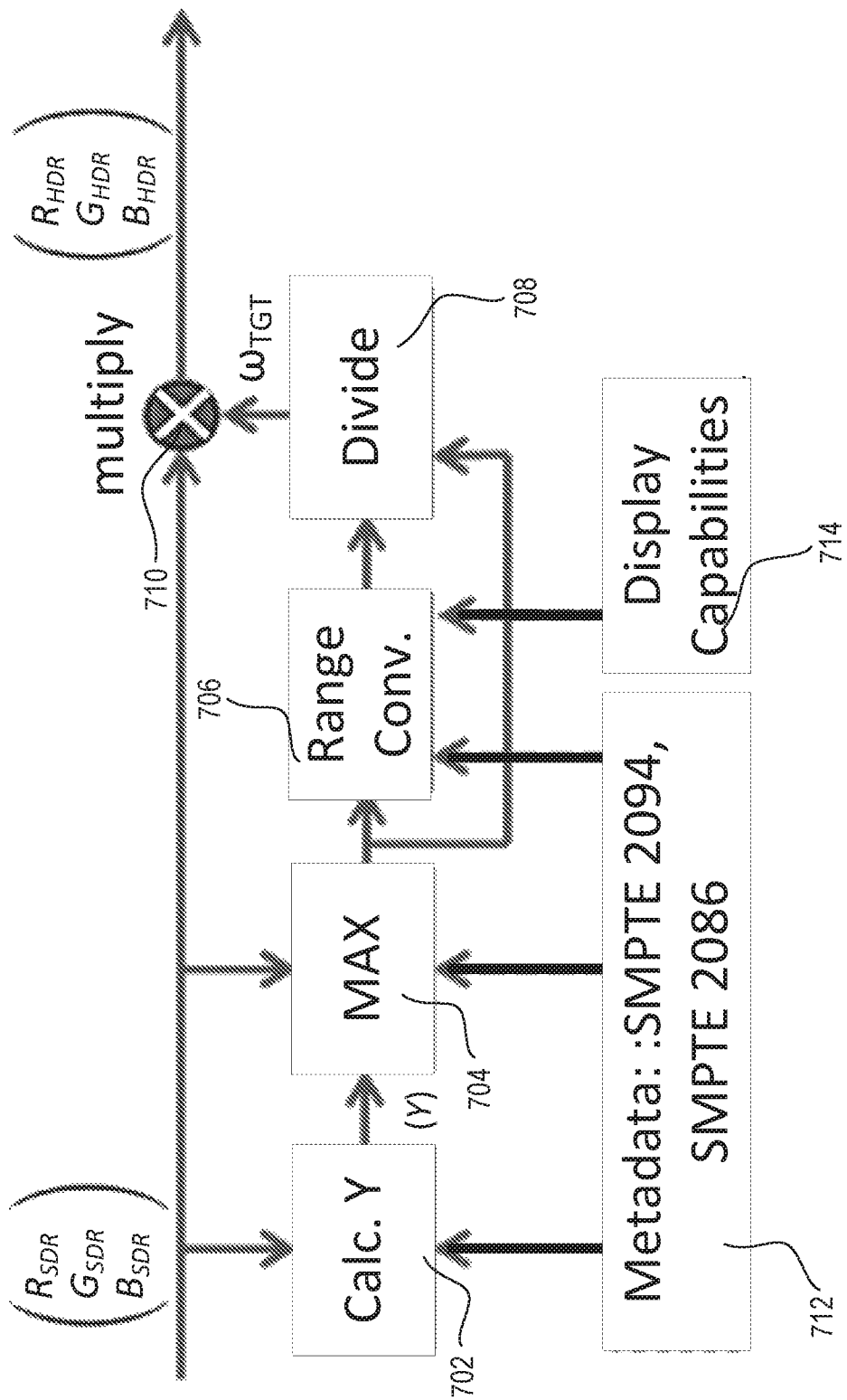
FIG. 7 shows an example of a conversion of SDR to HDR.

FIG. 7 shows an example of a conversion from SDR to HDR. As shown, RGB values of SDR may be used to calculate Y value at 702. Output of 702 may be used to calculate the max component per pixel at 704. Dynamic range conversion may be applied to the max component per pixel at 706. A ratio of output of the dynamic range conversion and the max component per pixel may be calculated to determine per pixel gain factor at 708. The SDR RGB value at 706 may be scaled by the gain factor per pixel to compute the HDR RGB value at 710. A calculation of SDR to HDR value for the maximum value at 704 and the dynamic range conversion at 706 may use metadata including, for example, Society of Motion Picture & Television Engineers Inc. (SMPTE) 2094 and SMPTE 2086 712. The dynamic range conversion at 706 may use display capabilities 714.

The range conversion 706 in FIG. 7 may be referred to as a tone mapping process. An input to a tone mapping process may be given by Eq. 1:

$$\text{Tone mapping input} = \text{Max}(\alpha R_S, \beta G_S, \gamma B_S, \delta Y) \qquad \text{Eq. 1}$$

where $(\alpha,\beta,\gamma,\delta)$ may represent tone mapping weights, e.g., as defined in the SMPTE ST 2094 dynamic metadata specification. Tone mapping weights may determine the relative weight of R, G, B and Y components in dynamic range conversion. In an example, $(\alpha,\beta,\gamma,\delta)$ may be set to $(1,1,1,1)$.

SDR to HDR mapping may be given by Eq. 2:

$$\begin{pmatrix} R_{HDR} \\ G_{HDR} \\ B_{HDR} \end{pmatrix} = \omega_{TGT} * \begin{pmatrix} R_{SDR} \\ G_{SDR} \\ B_{SDR} \end{pmatrix} \qquad \text{Eq. 2}$$

where target $(\omega_{TGT})$ dynamic range conversion may be configurable. This functionality may enable a display adapted dynamic range conversion to a (e.g., any) luminance range, such as from an SDR ($L_{MAXSDR}$) up to an HDR ($L_{MAXHDR}$), e.g., based on target display capabilities ($L_{TGT}$). $\omega_{TGT}$ may be given by Eq. 3.

$$\omega_{TGT} = \text{func\_Disp\_Adap}_{RC}(\omega, L_{MAXHDR(SMPTE\ 2086)}, L_{MAXSDR(SMPTE\ 2094)}, L_{TGT}) \quad \text{Eq. 3}$$

Figure 8:
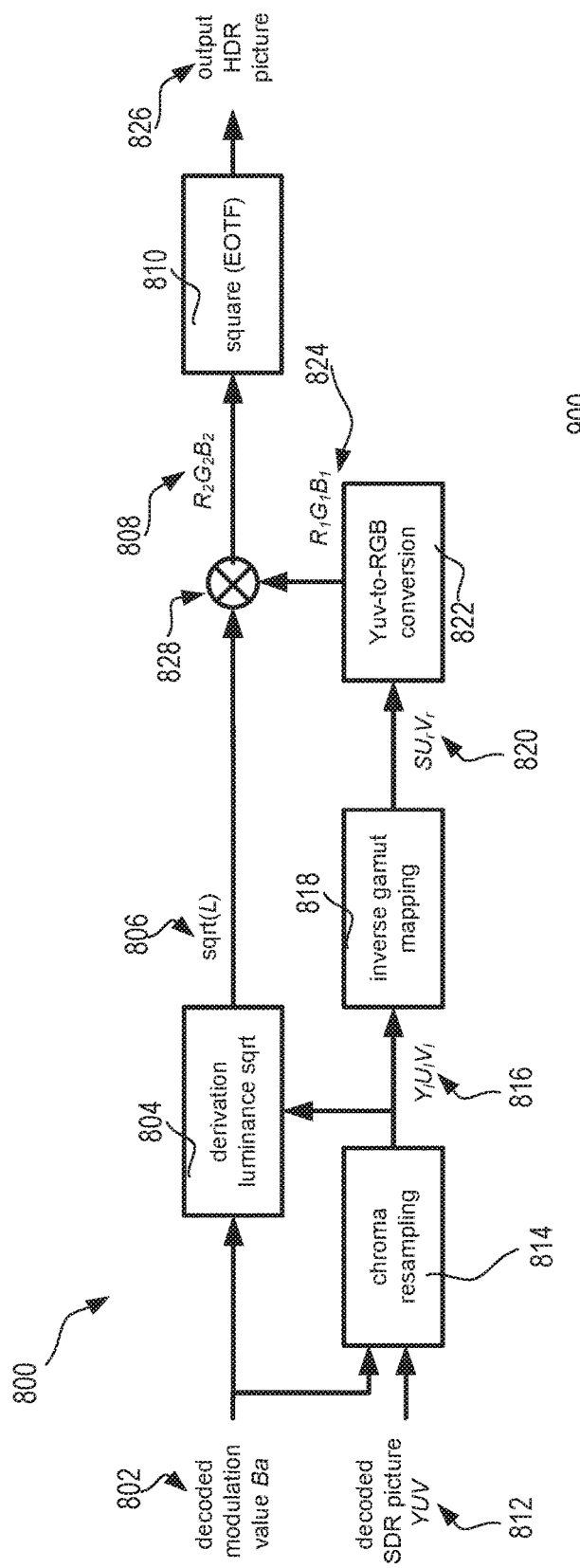
FIG. 8 shows an example of a conversion of SDR to HDR.

FIG. 8 shows an example conversion of SDR to HDR. Table 3 is an example summary of post-processing. The conversion process 800 may comprise derivation luminance sqrt 804, chroma upsampling 814, inverse gamut mapping and scaling 818, YUV-to-RGB conversion 822, and square (EOTF) 810. Inputs may be a decoded modulation value Ba 802 and/or a reconstructed SDR tri-stimulus sample value (Y,U,V) 812. Modulation value Ba may be calculated at the encoding stage and/or signaled as a metadata for dynamic range conversion. Derivation luminance sqrt 804 may be implemented, for example, by a ID Look-up Table. Decoded SDR picture YUV 812 may be used for chroma resampling at 814. Output of chroma resampling 816 may be used for inverse gamut mapping 818. An input to the inverse gamut mapping 818 may include decoded $Y_1U_1V_1$ 816 of SDR (e.g., with the modulation value Ba 802). Scaling may convert SDR dynamic range to HDR dynamic range. Inverse gamut mapping 818 may convert an SDR gamut, such as HD, to an HDR gamut, such as UHD. Output of inverse gamut mapping 820 may be used at 822. Output of chroma resampling 816 may be used for derivation luminance sqrt at 804. Output 824 of YUV-to-RGB conversion 822 and/or output 806 of deviation luminance sqrt 804 may be used for multiplication at 828. Output 808 of the multiplication 828 may be used to perform a square (EOTF) at 810 to generate a reconstructed linear-light HDR tri-stimulus sample value (R,G,B) 826.

Figure 9:
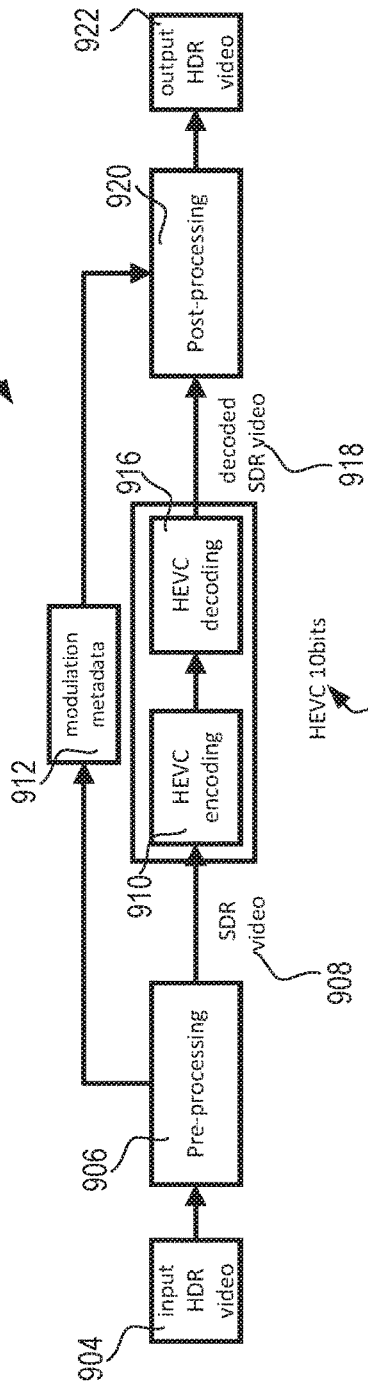
FIG. 9 shows an example process for an SDR backward compatibility operating mode.

FIG. 9 shows a process 900 with an SDR backward compatibility mode. The process 900 may receive input HDR video 904. The preprocessing 906 may generate SDR video 908. SDR video 908 may be provided for HEVC encoding at 910 and, HEVC 10 bits 914 may be generated. The process 900 may provide HEVC 10 bits 914 for HEVC decoding at 916. The HEVC decoding 916 may generate decoded SDR video 918. Post-processing may be performed on the decoded SDR video 918 at 920. The process 900 may output HDR video 922. Modulation metadata 912 that may be used to convert SDR to HDR in post-processing 920 may be signaled.

TABLE 3

Example of post-processing

| Post-processing | Details |
|---|---|
| $Y_i = Y + \max(0, a \cdot U + b \cdot V)$ | |
| $\begin{bmatrix} U_r \\ V_r \end{bmatrix} = \beta'(Y_i) \cdot \begin{bmatrix} U \\ V \end{bmatrix}$ | $\beta'(Y_i) = B_0(Ba, Y_i)/\sqrt{L(Ba,Y_i)}$ may depend on $Y_i$ but not Ba, or $P \cdot \beta'(Y_i)$ may be implemented as a 1D LUT with $Y_i$ as LUT entry. |
| Note: as $\begin{bmatrix} U \\ V \end{bmatrix} = \frac{1}{\beta_0(Ba, Y_i)} \cdot \begin{bmatrix} U_0 \\ V_0 \end{bmatrix}$ $\begin{bmatrix} U_r \\ V_r \end{bmatrix} = \frac{1}{\sqrt{L}} \cdot \begin{bmatrix} U_0 \\ V_0 \end{bmatrix}$ | |
| $T = k_0 \cdot U_r \cdot V_r + k_1 \cdot U_r^2 + k_2 \cdot V_r^2$ | T may be positive by construction |
| If T <= 1 $S = \sqrt{1-T}$ Else $U_r = U_r/\sqrt{T}$ $V_r = V_r/\sqrt{T}$ $S = 0$ | $S = \frac{1}{\sqrt{L}} \sqrt{L - k_0 \cdot U_0 \cdot V_0 - k_1 \cdot U_0^2 - k_2 \cdot V_0^2}$ In case $T > 1$ (e.g., due to quantization), $U_r$ and $V_r$ may be rescaled by $1/\sqrt{T}$ and S becomes 0. Rescaling may preserve hue while clipping $U_r$, $V_r$ may result in noticeable hue change. $\sqrt{\cdot}$ and $1/\sqrt{\cdot}$ functions may be implemented using two 1D LUTs. |
| $\begin{bmatrix} R_1 \\ G_1 \\ B_1 \end{bmatrix} = A^{-1} \cdot \begin{bmatrix} S \\ U_r \\ V_r \end{bmatrix}$ | |
| $\begin{bmatrix} R_2 \\ G_2 \\ B_2 \end{bmatrix} = \sqrt{L(Ba, Y_i)} \cdot \begin{bmatrix} R_1 \\ G_1 \\ B_1 \end{bmatrix}$ | $\sqrt{L(Ba,Y_i)}$: 1D LUT, interpolated for a (e.g., each) picture from 2 LUTs (e.g., with $Y_i$ as LUT entry), identified by Ba, peak luminance P, and the mastering display and container gamuts. |
| $\begin{bmatrix} R \\ G \\ B \end{bmatrix} = \begin{bmatrix} R_2^2 \\ G_2^2 \\ B_2^2 \end{bmatrix}$ | May be combined with a final adaptation of the linear-light signal to the display EOTF. |

Figure 10:
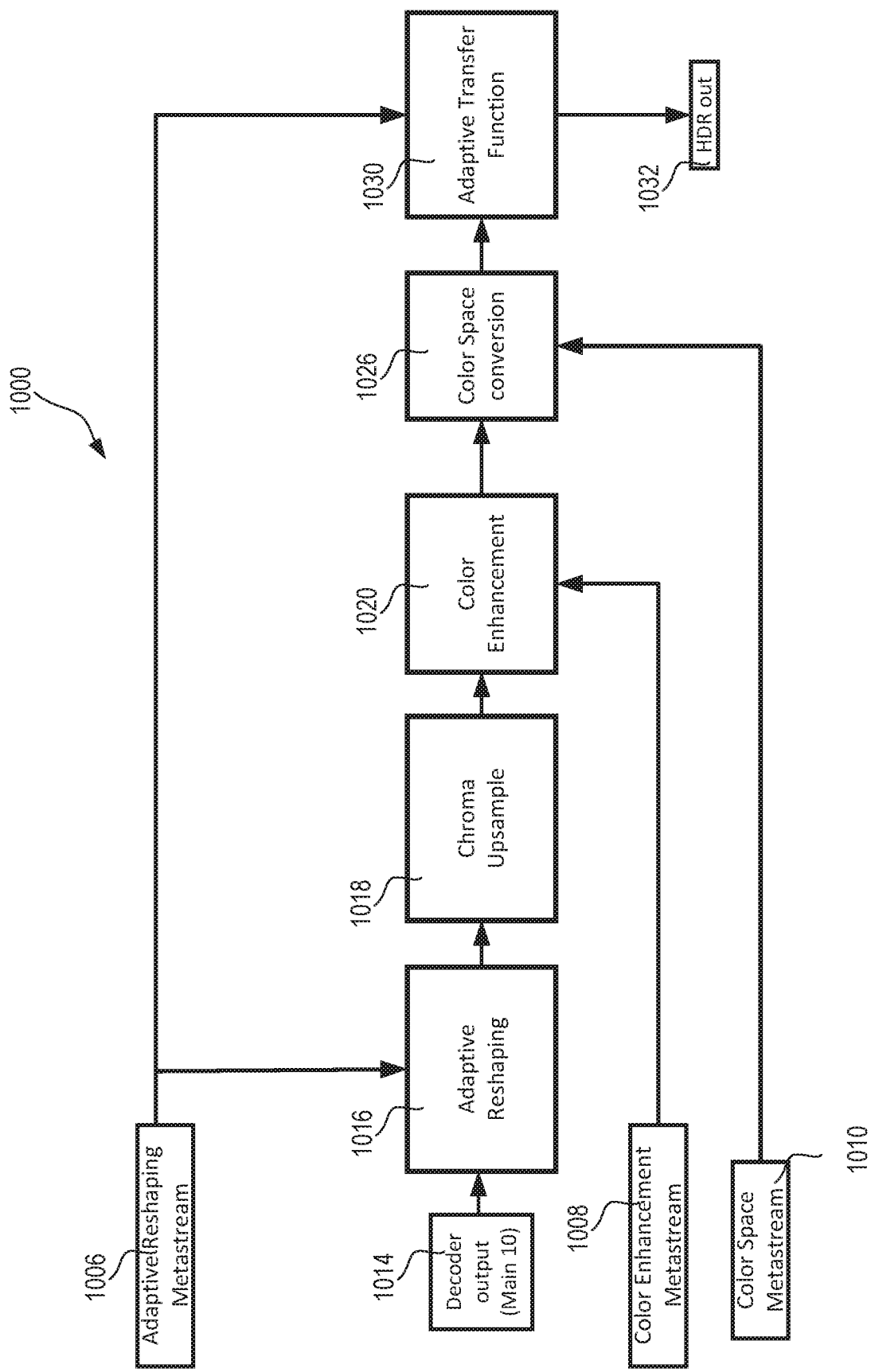
FIG. 10 shows an example post-processing HDR reconstruction process.

FIG. 10 shows an example of a post-processing HDR reconstruction process 1000 with a non SDR compatibility (e.g., HDR-only) operating mode. As shown, common submodules may be reused. For example, a signal processing device (e.g., a decoder or a display) may receive output (e.g., main 10) 1014 and go through adaptive reshaping 1016, chroma upsampling 1018, color enhancement 1020, color space conversion 1026, and adaptive transfer function 1030, and output HDR video 1032. The adaptive reshaping may use adaptive reshaping metadata identified from the adaptive reshaping metastream 1006. Color enhancement 1020 may use color enhancement metadata identified from color enhancement metastream 1008. Color space conversion may use color space metadata identified from color space metastream 1010.

A processing flow may be used in an end-to-end video delivery chain to achieve both backward compatible (e.g., SDR and HDR) and non-backward compatible (e.g., HDR-only) delivery. A backward compatible process may be harmonized with an HDR-only delivery flow to maintain high fidelity in reconstructed HDR video.

HDR and SDR video may have different color gamuts. An architecture may support both HDR adaptation and WCG support. A gain factor relating SDR and HDR may be implicitly encoded by pixel values. A signal processing device may perform a similar calculation allowing determination of gain. HDR may be reproduced from SDR using this gain factor. Linear domain expressions shown in Eq. 2 may, for example, be based on an assumption that SDR and HDR RGB values are expressed with the same color primaries but differ in dynamic ranges.

Various techniques may be harmonized in an architecture. Example architectures of pre-processing and post-processing functions may be shown herein. Example architectures may comprise one or more functional blocks common to multiple operating modes.

Figure 11:
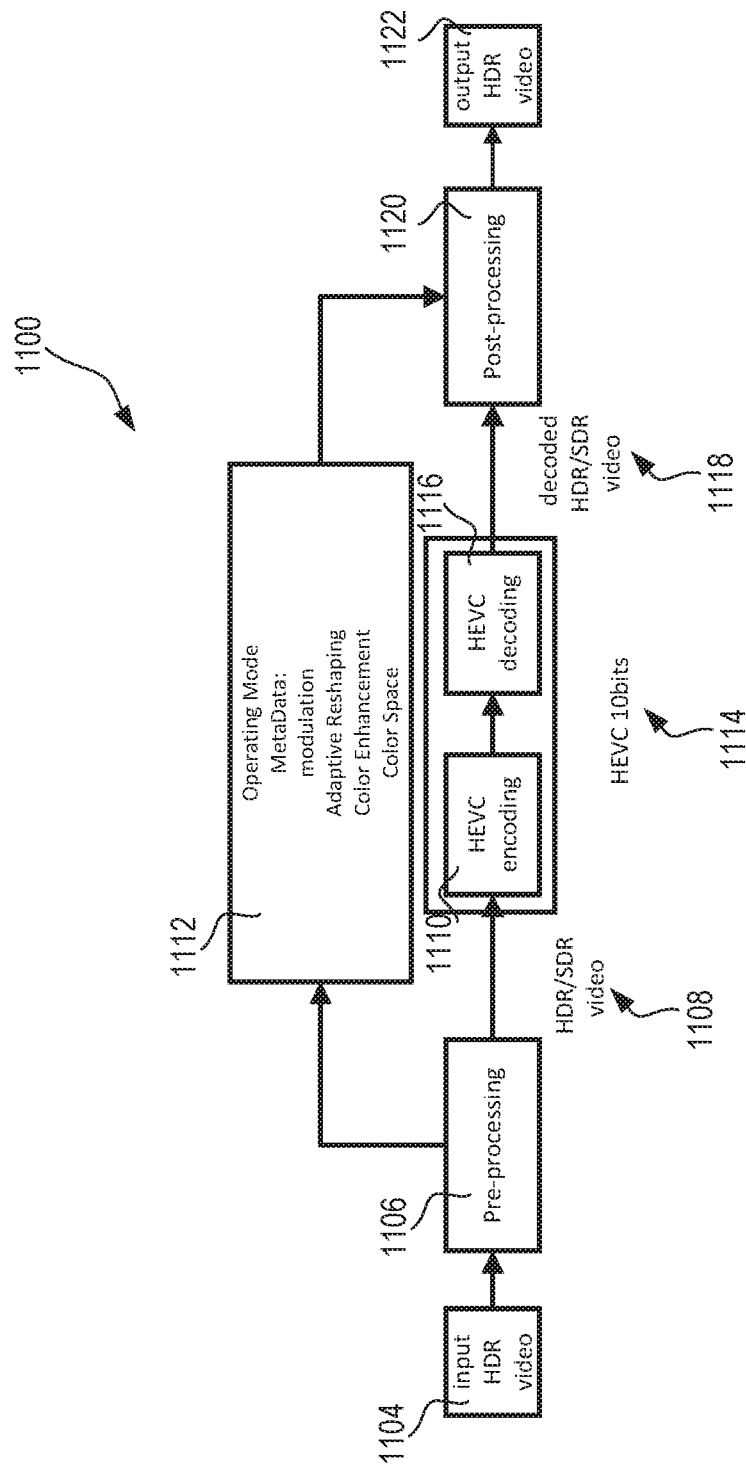
FIG. 11 shows an example process for SDR and HDR operating modes.

FIG. 11 shows an example process for SDR and HDR operating modes. As an example, the structure shown in FIG. 9 may be combined with other techniques (e.g., FIG. 4), for example, by sharing various technical elements (e.g., functional blocks) to provide both HDR only and HDR with SDR backward compatibility operating modes. The HDR-only mode may be optimized for HDR/WCG compression. The SDR-backward compatibility mode may provide an SDR output for backward compatibility. The process 1100 may receive input HDR video 1104. The preprocessing 1106 may generate HDR/SDR video 1108. The process 1100 may provide HDR/SDR video 1108 for HEVC encoding at 1110 and generate HEVC 10 bits 1114. The process 1100 may provide HEVC 10 bits 1114 for HEVC decoding at 1116. The HEVC decoding 1116 may generate decoded HDR/SDR video 1118. The decoded HDR/SDR video 1118 may be for post-processing at 1120. The process 1100 may output HDR video 1122. An indication of the operating mode and HDR reconstruction metadata 1122 may be used to control various tools in post-processing.

Metadata from multiple techniques may be included in a union and supported by metadata 1112, e.g., operating mode metadata. The metadata may include modulation metadata used to control a process that converts HDR to SDR and/or SDR to HDR (e.g., as shown in FIG. 8 and FIG. 9). The metadata may include color space metadata indicating IPT-PQ space, adaptive reshaping metadata that redistributes useable codewords for color components, and/or color enhancement metadata that enhances and repairs distorted edges due to quantization during compression (e.g., as shown in FIG. 4).

Operating mode metadata (e.g., 1112) may comprise an operating mode indication. The operating mode indication may indicate whether the HDR coding is operated in an HDR-only mode or an SDR-backward-compatible mode. Different functional blocks may be invoked in the decoding process/post-processing to fully reconstruct the HDR video (e.g., with or without reconstructing an accompanying SDR signal), for example, depending on the operating mode metadata that comprises the operating mode indication.

Figure 12:
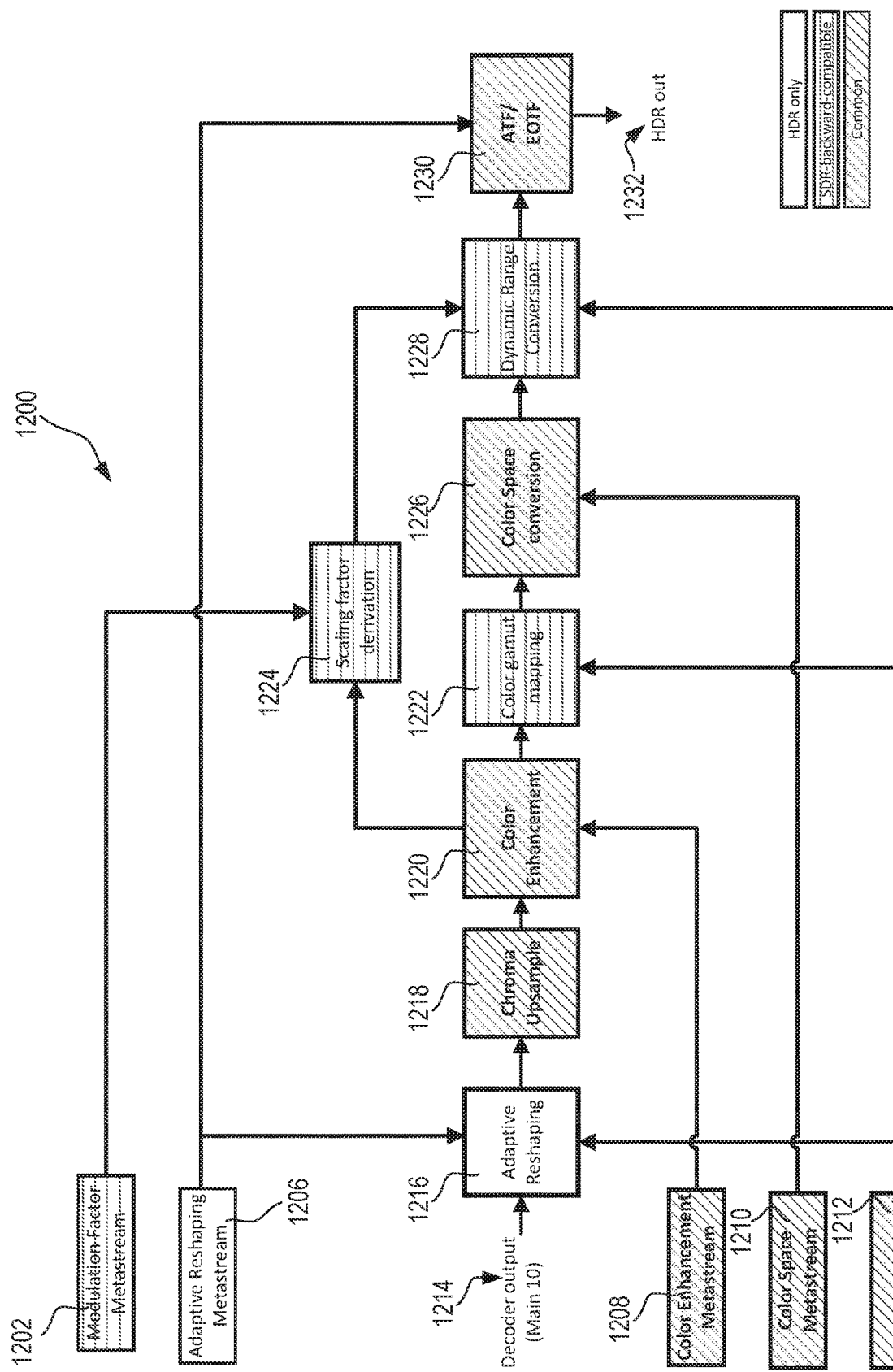
FIG. 12 shows an example architecture for post-processing HDR reconstruction process with multiple operating modes.

A post-processing HDR reconstruction process may operate in an SDR backward compatible mode or a non-SDR backward-compatible (e.g., HDR-only) mode depending on a format of video signal that is received. For example, the format of the video signal may be indicated by an operating mode indication. FIG. 12 shows an example post-processing HDR reconstruction architecture. The architecture 1200 may comprise one or more of adaptive reshaping 1216, chroma upsampling 1218, color enhancement 1220, color gamut mapping 1222, scaling factor derivation 1224, color space conversion 1226, dynamic range conversion 1228, ATF/EOTF 1230, and/or the like. The architecture 1200 may operate using metadata including modulation factor metastream 1202, adaptive reshaping metastream 1206, color enhancement metastream 1208, color space metastream 1210, operating mode metadata 1212 and/or the like.

The post-processing HDR reconstruction process may include various function blocks based on the format of the received video signal. When the format of the received video signal is SDR the post-processing HDR reconstruction process may operate in a SDR backward compatible mode. When the format of the received video signal is HDR, the post-processing HDR reconstruction process may operate in non-SDR backward-compatible mode (e.g., a HDR-only mode). An indication of the format of the received video signal may be supported by the operating mode indication (e.g., operating mode indication 1212). The operating mode indication may be signaled, for example, as a flag or by a peak luminance of the received video signal. For example, in FIG. 12, when the format of the received video signal is SDR as indicated by the operating mode indication 1212, the architecture 1200 may include one or more of chroma upsampling 1218, color enhancement 1220, scaling factor derivation 1224, color gamut mapping 1222, color space conversion 1226, dynamic range conversion 1228, and adaptive transfer function (ATF)/EOTF 1230. When the format of the received video signal is HDR as indicated by the operating mode indication 1212, the process 1200 may include one or more of adaptive reshaping 1216, chroma upsampling 1218, color enhancement 1220, color space conversion 1226, and ATF/EOTF 1230.

The post-processing HDR reconstruction process may use functional blocks that are common for multiple operating modes (e.g., the SDR backward compatible operating mode and the non-SDR backward-compatible operating mode). For example, in FIG. 12, functional blocks common to both of the SDR backward compatible operating mode and the non-SDR backward-compatible operating mode may comprise, for example, one or more of, chroma upsampling 1218, color enhancement 1220, color space conversion 1226, and/or ATF/EOTF 1230. Color enhancement 1220 may be shown in the non-SDR backward-compatible operating mode but may be extended and applied to the SDR-compatible operating mode. Color space conversion 1226 may use color space metadata, for example, to indicate a codec native color space (e.g., a color space of the input signal to and output signal from the codec, such as an HEVC main 10 codec) used by the delivery system. A codec native color space may be, for example, a Y'CbCr color space used for an SDR decoded signal, an IPT-PQ color space used by an HDR decoded signal, or a color space that provides a good color component decorrelation function with reasonable complexity. ATF/EOTF may apply a transfer function (TF), e.g., to convert a non-linear video signal to linear light domain. A decoding process/post-processing may be adaptive, for example, with transfer function parameters being signaled as part of adaptive reshaping metadata (e.g., 1206).

The post-processing HDR reconstruction process may use functional blocks that are not common for multiple operating modes (e.g., the SDR backward compatible operating mode and the non-SDR backward-compatible operating mode). For example, in FIG. 12, the functional blocks that is performed (e.g., uniquely performed) under SDR backward compatible operating mode may include one or more of scaling factor derivation 1224, color gamut mapping 1222, and dynamic range conversion 1228. Scaling factor derivation 1224 may be used to derive a scaling factor (e.g., the scaling factor used in Eq. 2) that is used to convert a standard dynamic range to a high dynamic range. The derivation may be based on local pixel characteristics, for example, as shown in Eq. 3. Color gamut mapping 1222 may be used, for example, to convert a first color gamut used by a decoded SDR signal to a second color gamut used by an HDR signal. A first color gamut and a second color gamut may be different. As an example, a first color gamut may be HD and a second color gamut may be P3 or UHD. Dynamic range conversion 1228 (e.g., inverse tone mapping) may be used to expand the dynamic range of an SDR signal to that of an HDR signal. A modulation factor Ba technique or an inverse tone mapping function, e.g., as depicted in an example in FIG. 15, may be used for dynamic range conversion. In FIG. 12, the functional blocks that is performed (e.g., uniquely performed) under non-SDR backward compatible operating mode (e.g., HDR-only operating mode) may include adaptive reshaping. Adaptive reshaping may be useful for some codec color space, such as the IPT-PQ color space. In the IPT-PQ color space, I, P and T components may have limited dynamic range(s), for example, after color space conversion and fixed-point conversion (e.g., from floating point to 10-bit or 16-bit). Adaptive reshaping may include a process used to expand the I/P/T component range, for example, to efficiently distribute available codewords (e.g., values between 0 and $2^N-1$ for N-bit implementation) to color components.

The order in which one or more of functional blocks are performed may be varied to improve coding efficiency and/or quality of the video signal. The order may be adjusted based on the metadata signaled in the HDR message. For example, in FIG. 12, when the operating mode indicates the format of the received video signal is SDR, decoded video signal 1214 may be upsampled at 1218. The upsampled output at 1218 may be processed with the color enhancement 1220. The output video signal of the color enhancement 1220 may be processed with color gamut mapping 1222 and/or scaling factor derivation 1224. The output video signal of the color gamut mapping 1222 may be processed with the color space conversion 1226. The output video signal of the scaling factor derivation 1224 (e.g., a scaling factor) and the output video signal of the color space conversion 1226 may be processed with dynamic range conversion 1228. The output video signal of the dynamic range conversion 1228 may go through a transfer function at 1230 and become HDR video signal 1232. In FIG. 12, when the operating mode indicates the format of the received video signal is HDR, the decoded video signal 1214 may be processed with the adaptive reshaping 1216. The output video signal of the adaptive reshaping 1214 may be upsampled at 1218. The upsampled output at 1218 may be processed with the color enhancement 1220. The output video signal of the color enhancement 1220 may be processed with the color space conversion 1226. The output video signal of the color space conversion 1226 may go through a transfer function at 1230 and become HDR video signal 1232.

A signal processing device may be aware that a received video signal is coded HDR or coded SDR bitstream and identified metadata accordingly. The signal processing device may be embedded in the display. The signal processing device may comprise a decoder. Some of the functional blocks herein may be performed by the display and some of the functional blocks herein may be performed by the decoder, e.g., when the signal processing device operates in the SDR backward compatible operating mode. Some of the functional blocks herein may be performed by the display and some of the functional blocks herein may be performed by the decoder, e.g., when the signal processing device operates in the non-SDR backward-compatible operating mode. For example, the adaptive reshaping 1214 may be performed by the decoder and the color enhancement 1220, color space conversion 1226, and transfer function 1230 may be performed by a signal processing device on the display, when one or more of the decoder or the display operates in the non-SDR backward-compatible operating mode.

The signal processing device may switch between the SDR backward compatible operating mode and the non-SDR backward-compatible operating mode, for example, based on metadata signaling that comprises an operating mode indication (e.g., the operating mode indication 1212). The signal processing device may identify various metadata from metastreams for processing the received video signal. For example, in FIG. 12, the signal processing device may receive video signal and metadata including an operating mode indication that indicates the received video signal is coded SDR. The signal processing device may upsample the received SDR video signal from 4:2:0 chroma format to 4:4:4 chroma format at 1218. The signal processing device may identify color enhancement metadata from color enhancement metastream 1208 and use the color enhancement metadata to perform color enhancement on the video signal at 1220. The signal processing device may convert a first color gamut used by the video signal to a second color gamut used by an HDR signal at 1222. The signal processing device may identify color space metadata from color space metastream 1210 and convert a codec native color space Y'CbCr to R'G'B' color space at 1226. The signal processing device may identify modulation factor metadata from modulation factor metastream 1202, and use the modulation factor metadata to derive a scaling factor at 1224. The signal processing device may expand the dynamic range of the video signal (e.g., SDR signal) to that of an HDR signal at 1228. The signal processing device may identify adaptive reshaping metadata including transfer function parameters from the adaptive reshaping metastream 1206 and use the adaptive reshaping metadata to perform a transfer function on the video signal at 1230.

Metadata including the operating mode indication may be signaled in, for example, video usability information (VUI) or supplemental enhancement information (SEI). SEI messages may be indicated using one of multiple NAL-unit types (e.g., prefix SEI or suffix SEI). SEI messages may be classified based on a SEI payload type. The VUI and/or SEI, may be considered non-normative for signal processing. VUI and/or SEI metadata may be considered normative to the signal processing, for example, when they are used (e.g., in the example shown in FIG. 12) in reconstruction process of an HDR signal (e.g., with or without an accompanying SDR signal).

An HDR message for HDR reconstruction related metadata may be established in lieu of or in addition to using VUI or SEI to signal metadata (e.g., in the example shown in FIG. 12) in a reconstruction process of an HDR signal (e.g., with or without an accompanying SDR signal). A signal processing device and/or a network may be able to treat HRI messages with higher priority for HDR video applications. For example, the signal processing device may treat HRI messages as high priority messages given their use in correct HDR reconstruction. The signal processing device may differentiate the HRI messages from the SEI messages. As an example, a NAL-unit type may be assigned to carry a plurality of types of HDR reconstruction metadata, which may be labeled, for example, HDR reconstruction information (HRI) or HDR reconstruction metadata. The HRI messages may be considered normative. HRI or HDR reconstruction related metadata may comprise one or more of the following: the operating mode indication, modulation factor metadata, adaptive reshaping metadata color enhancement metadata, color space metadata, and/or the likie. A signal processing device may parse an NAL-unit type and find that it indicates HRI. A signal processing device may parse the HRI payload type for HDR reconstruction metadata. A type of HDR reconstruction metadata, e.g., metadata associated with a functional block as shown in FIG. 12, may be assigned a payload type. The payload type may indicate the type of the HDR reconstruction metadata. Additional syntax elements that correspond to a HRI payload type may be signaled, which may be analogous to the syntax structure of SEI messages.

Backward compatibility may be implemented, for example, with a scalable coding system, such as scalable extensions of HEVC (SHVC). Inter-layer processing may be improved, for example, by considering the relationship between HDR and SDR.

Figure 13A:
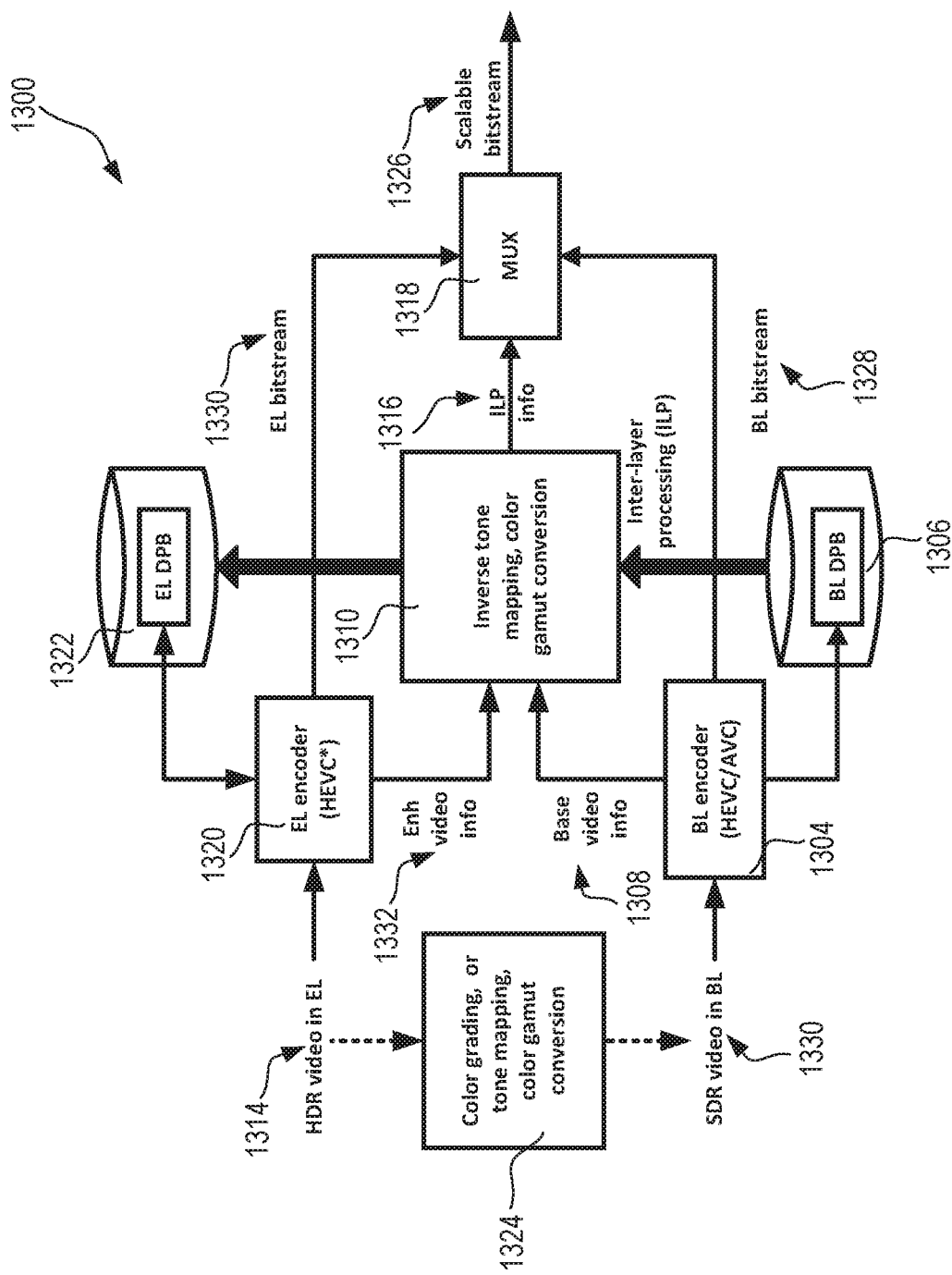
FIG. 13A shows an example scalable encoder with multiple layers in a scalable encoding and decoding system that conveys SDR and HDR videos.
Figure 13B:
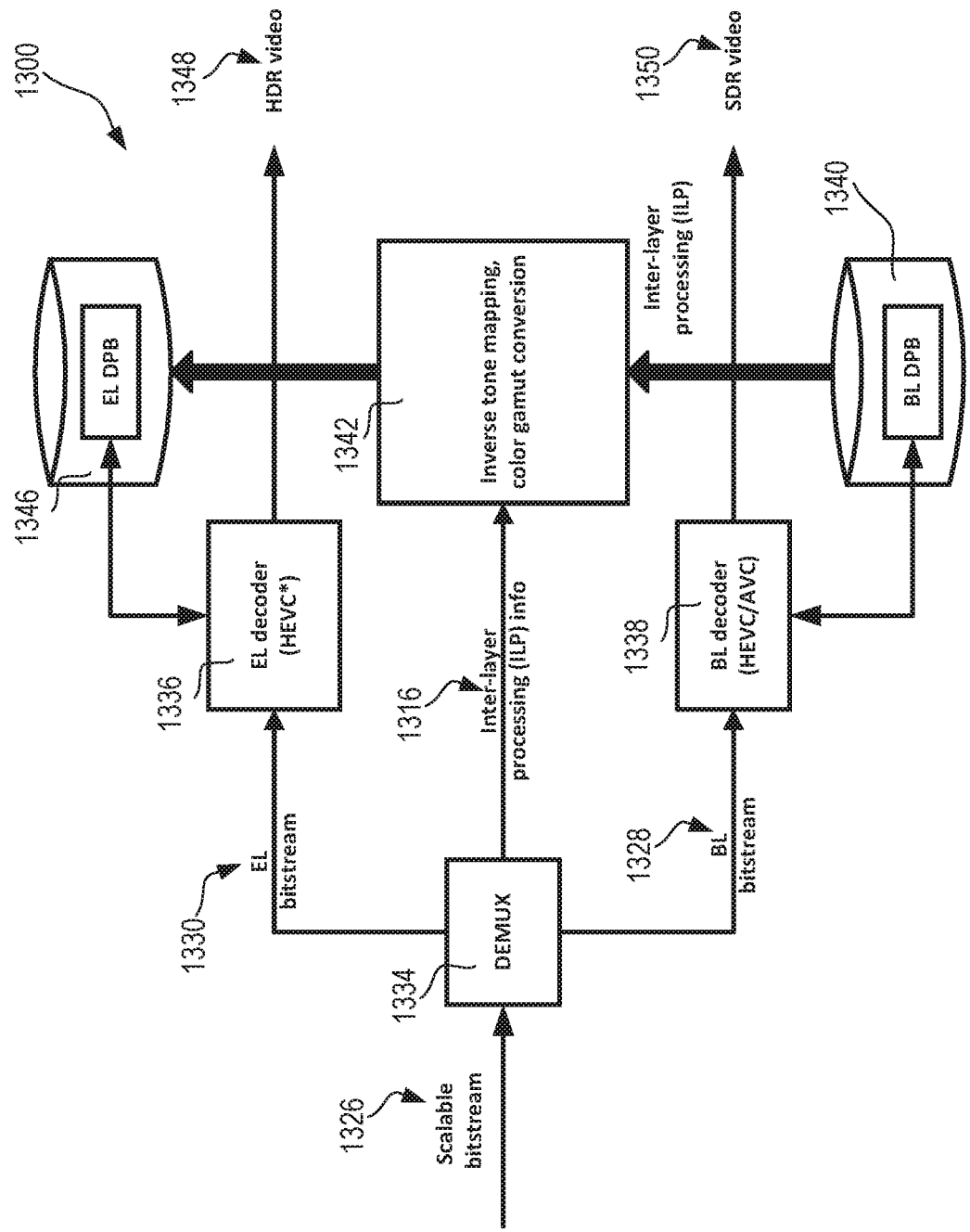
FIG. 13B shows an example scalable decoder with multiple layers in a scalable encoding and decoding system that conveys SDR and HDR videos.

FIGS. 13 A and B provide examples of a scalable encoding and decoding system that support SDR and HDR. FIG. 13A shows an example scalable encoder with two layers in a scalable encoding and decoding system that conveys SDR and HDR videos. FIG. 13B is an example of a scalable signal processing device with two layers in a scalable encoding and decoding system that conveys SDR and HDR videos.

An SDR video may be delivered in a base-layer, and an HDR video may be delivered in an enhancement-layer. The BL encoder 1304 (e.g., an HEVC//AVC) encoder) in FIG. 13A may encode the SDR BL video input 1330 and provide BL video information 1308 for inter-layer processing (ILP) at 1310. The BL encoder 1304 may establish a base layer decoded picture buffer (DPB) 1306 to store reconstructed SDR videos to perform prediction of input SDR video signal. e.g., through temporal motion compensated prediction. The ILP 1310 may process videos (e.g., pictures) from the BL DPB 1306 before using them to predict an EL video. ILP 1310 may convert a coded SDR to HDR format with metadata information. The converted HDR video may be used as inter layer reference pictures, e.g., to predict HDR videos in the enhancement layer. An ILP 1310 may comprise inverse tone mapping (e.g., to convert the dynamic range of SDR to the dynamic range of HDR) and color gamut expansion (e.g., from HD in BL to UHD in EL). Inverse tone mapping may be applied before color gamut conversion, although the order may be exchanged in different designs or implementations. A converted HDR picture may be inserted in a DPB 1322, which may be used as reference picture for enhancement-layer picture coding. The EL encoder 1320 (e.g., an HEVC encoder) in FIG. 13A may encode HDR EL video input 1314 and provide EL video information 1332 for ILP at 1310. The HDR EL video input 1314 may be converted to the SDR BL video input 1330 through one or more of color grading, tone mapping, color gamut conversion at 1324. Metadata of ILP (e.g., ILP information 1316), which may include inverse tone mapping parameters and color gamut conversion parameters, may be signaled, for example, at a sequence level or a scene based picture level. The multiplexer (MUX) 1318 may multiplex, for example, NAL units carrying ILP information 1316, with the EL bitstream 1330 and BL bitstream 1328 and output scalable bitstream 1326. The EL encoder 1320 may signal the parameters used during ILP 1342 to the EL decoder 1336.

The bitstream de-multiplexer (DEMUX) 1334 may receive scalable bitstream 1326 and demultiplex the scalable bitstream 1326 to EL bitstream 1330, BL bitstream 1328 and ILP information 1316. The BL decoder 1338 (e.g., a HEVC/AVC decoder) may use the BL bitstream 1328 to reconstruct a BL SDR picture. The reconstructed BL SDR picture may be inserted in BL DPB 1340. The BL decoder (e.g., a HEVC/AVC decoder) may output SDR video 1350. ILP 1342 may utilize the BL reconstructed SDR picture and apply inter layer processing techniques according to the ILP information 1316 provided by the bitstream de-multiplexer (DEMUX) 1334 to produce a processed EL reconstructed HDR picture. ILP 1342 may comprise inverse tone mapping and color gamut conversion. The processed EL reconstructed picture may be inserted in the EL DPB 1346. The EL decoder 1336 may output HDR video 1348.

A scalable system design based on SHVC may be implemented and may define an ILP process to convert SDR to HDR. A scalable delivery system may provide HDR signal information while maintaining SDR quality. A scalable delivery system may utilize multiple layer decoding.

Figure 14:
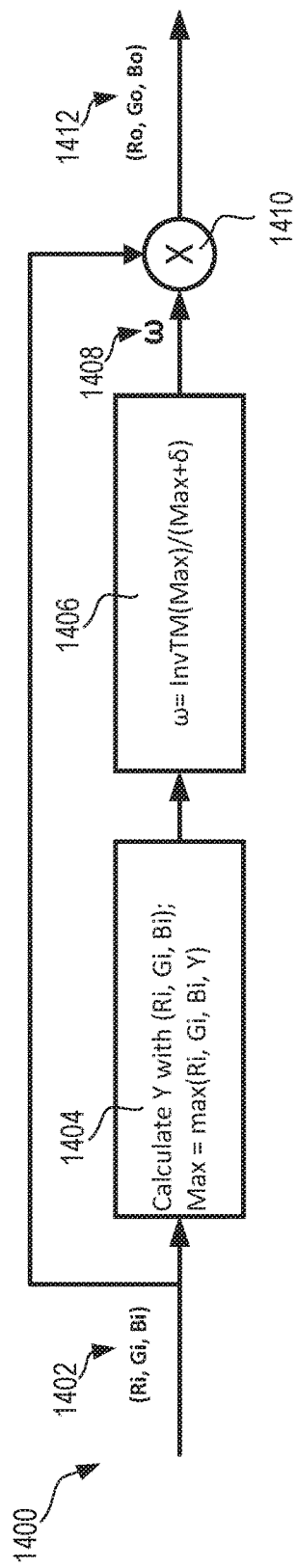
FIG. 14 shows an example of an inverse tone mapping technique.

FIG. 14 shows an example inverse tone mapping technique. A gain factor w may be derived for a pixel (e.g., based on RGB components for the pixel). A component value may be scaled by a gain factor to produce a corresponding pixel of HDR, e.g., as shown in FIG. 14. A gain factor ω 1408 may be derived given an SDR input pixel (Ri, Gi, Bi) 1402. As shown, pixel (Ro, Go, Bo) 1412 may be an output HDR pixel. An inverse tone mapping function may be denoted as InvTM(x) (e.g., as shown at 1406). Luminance Y may be calculated, for example, based on (Ri, Gi, Bi) at 1404. A maximum value of (Ri, Gi, Bi, Y) may be derived and denoted as Max at 1404. The gain factor ω 1408 for (Ri, Gi, Bi) 1402 may be calculated at 1406, for example, as shown in Eq. 4:

$$\omega = \text{InvTM}(\text{Max})/(\text{Max}+\delta) \qquad \text{Eq. 4}$$

where δ may be a small value, e.g., to avoid division by zero. The SDR input pixel (Ri, Gi, Bi) 1402 may be used to derive (Ro, Go, Bo) 1412 by other implementations (e.g., other inverse tone mapping techniques) at 1410.

A gain factor may be derived at a receiver side. A function definition used in a gain estimation process may be signaled.

Figure 15:
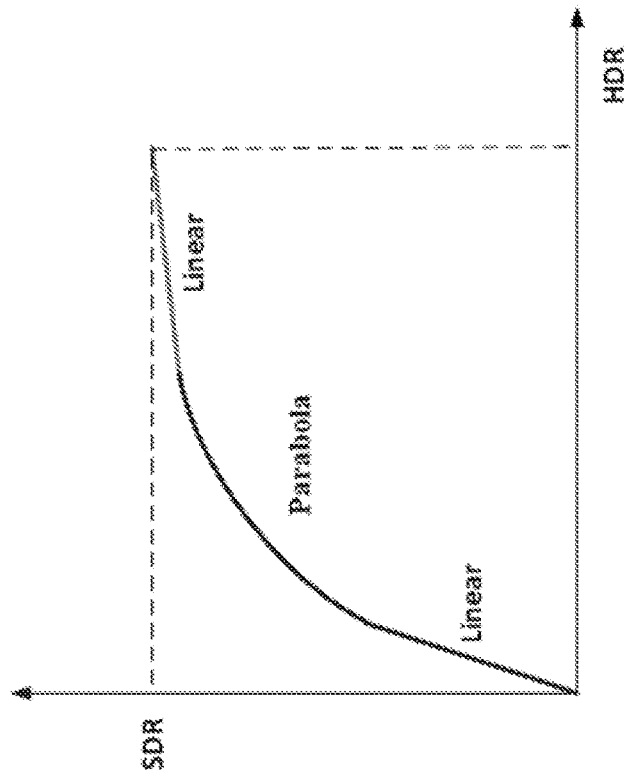
FIG. 15 shows an example of a function that may be used for gain factor estimation in inverse tone mapping.

FIG. 15 shows an example of a function that may be used for gain factor estimation in inverse tone mapping. There may be four parameters for a three-segment curve, e.g., two linear curves at two ends connected with a parabola curve. Parameters may be trained at an encoding stage given SDR and HDR signals. Other inverse tone mapping techniques may be used. A gain factor may be signaled through a modulation channel. Modulation channel may comprise an in-band signaling.

A gain factor for a pixel of a component may be a mean value of a local window. A gain factor may be calculated, for example, as shown in Eq. 5:

$$\omega(x, y) = \sum_{j=-H/2}^{H/2} \sum_{i=-W/2}^{W/2} C(x+i, y+j)/N \qquad \text{Eq. 5}$$

where H and W may be the height and width of a local window, and N may be the number of pixels located in the local window.

A color gamut conversion may be performed, for example, using a 3D look-up table, which may be similar to a color mapping process in color gamut scalability of SHVC.

An example of gain calculation is shown in the SDR to HDR process in the decoder example in FIG. 7. The lower portion of the diagram shows processing to calculate a gain value that is multiplied per sub-pixel component in the linear domain.

Figure 16:
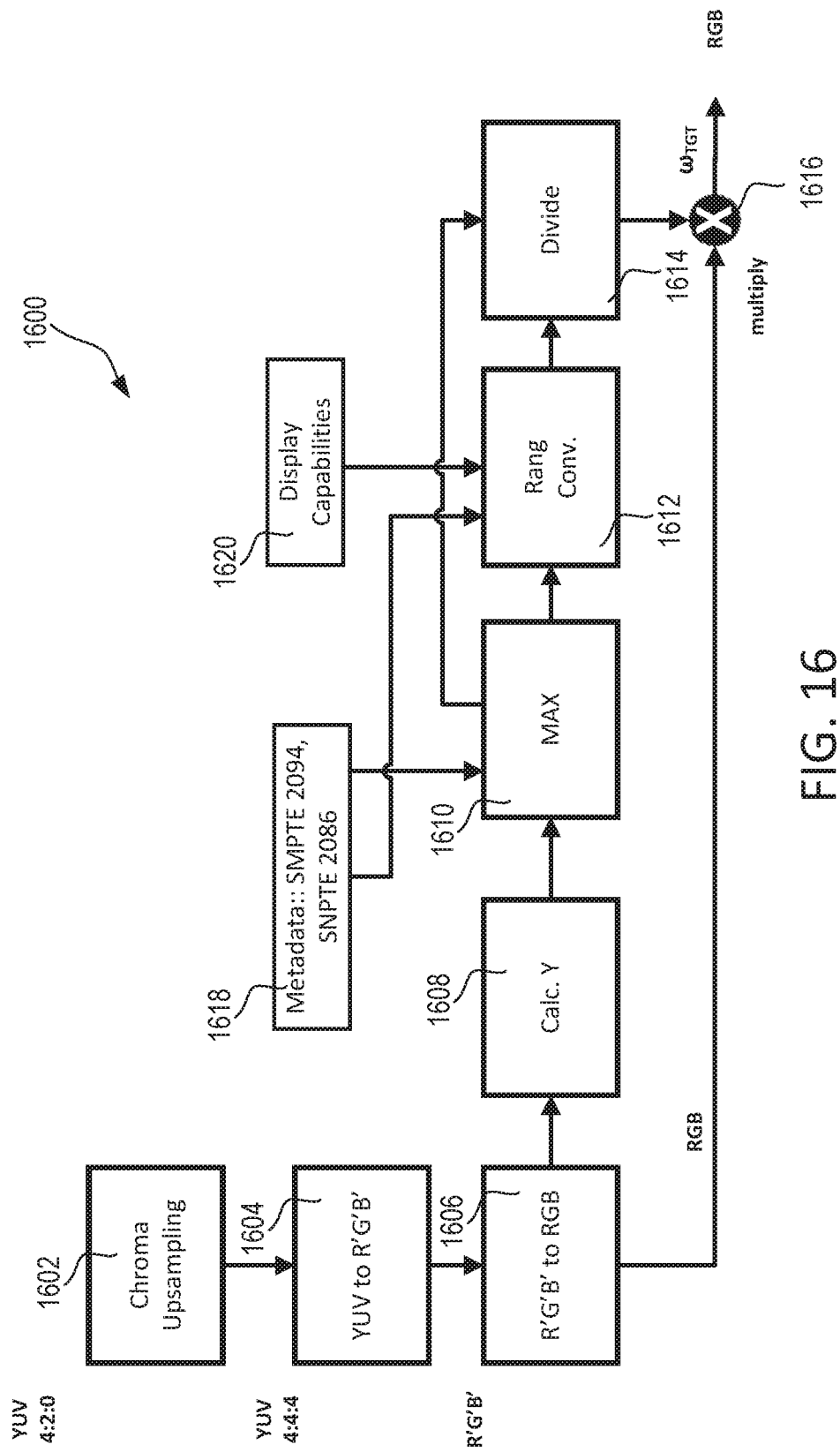
FIG. 16 shows an example of gain calculation.

FIG. 16 shows an example of gain calculation. Gain calculation 1600 shown in FIG. 16 may comprise one or more of the following, for example, after decoding the SDR sample values. Gain calculation 1600 may include chroma upsampling conversion of YUV from 4:2:0 to 4:4:4 at 1602. Gain calculation 1600 may include inverse color space conversion from YUV to R'G'B' at 1604. Gain calculation 1600 may include conversion to linear domain RGB at 1606. Gain calculation 1600 may include calculation of max component per pixel at 1608. Gain calculation 1600 may include calculation of SDR to HDR value for the maximum value at 1610. Dynamic range conversion may be applied to the max component per pixel at 1612. A ratio of output of the dynamic range conversion and the max component per pixel may be calculated to determine per pixel gain factor at 1614. The SDR RGB value at 1606 may be scaled by the gain factor per pixel to compute the HDR RGB value at 1616. A calculation of SDR to HDR value for the maximum value may be performed at 1610, and the dynamic range conversion 1612 may use metadata including, for example, SMPTE 2094 and SNPTE 2086 at 1618. The dynamic range conversion 1612 may use display capabilities.

Figure 17:
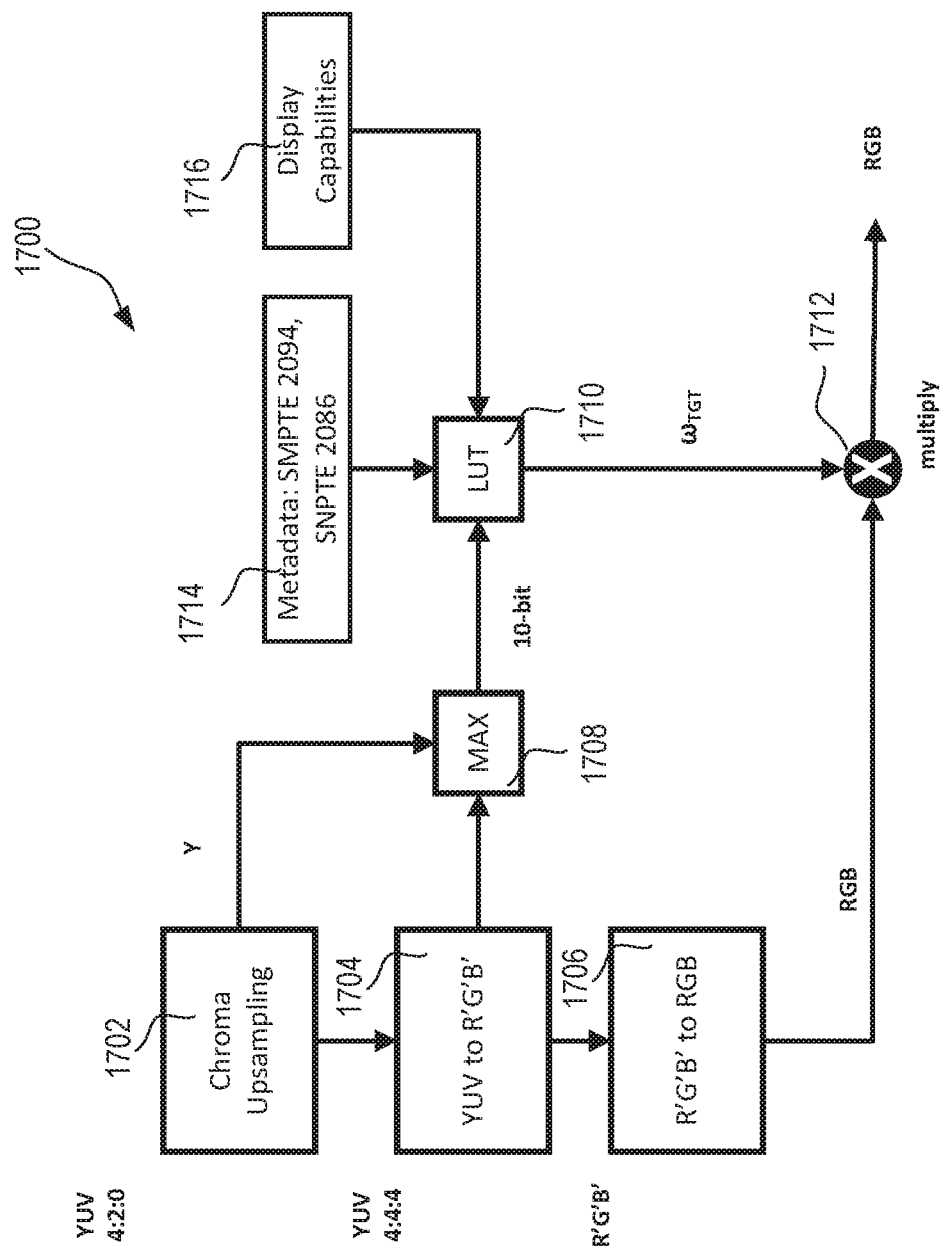
FIG. 17 shows an example of simplified gain calculation via lookup table (LUT).

FIG. 17 shows an example of simplified gain calculation via LUT. A gain factor calculation may be performed from 4:4:4 R'G'B' data, e.g., as shown in FIG. 17. Conversion to the linear domain to determine the gain factor and/or a per pixel division operation may be bypassed. An N-bit LUT may be used for a system that uses M-bit R'G'B' and Y data with N>=M (e.g., M=10 as shown in FIG. 17). LUT access (e.g., a single LUT access) may avoid computing the tone mapped values and/or division operation per pixel. Values in the LUT may be computed offline, for example, by processing a possible max value through a full linear domain conversion, tone mapping, and/or division process to calculate the LUT entry at the possible max value. The example gain calculation 1700 may determine the gain factor from the down-sampled YUV data. Gain calculation 1700 shown in FIG. 17 may comprise one or more of the following, for example, after decoding the SDR sample values. The example gain calculation 1700 may include chroma upsampling conversion of video signal from 4:2:0 to 4:4:4 at 1702. An output of the chroma upsampling 1702 may be used to convert the video signal from YUV to R'G'B' at 1704. The output of 1704 R'G'B' may be used to convert the video signal to linear domain RGB at 1706. A calculation of SDR to HDR value for the maximum value may be performed at 1708. A LUT may be used at 1710 to determine the gain factor from the downsampled YUV data. The LUT entries may be determined using metadata SMPTE 2094, SNPTE 2086 at 1714. The calculation of the LUT may use display capabilities 1716. The LUT at 1710 may provide gain factor value for multiplication with the output of 1706 (e.g., linear domain RGB) at 1712. The linear domain RGB may be multiplied with the gain factor that is determined from the LUT to generate the video signal in RGB.

WCG content may be handled while supporting legacy (e.g., HD) color gamut. An SDR backward compatibility technique may assume that both the SDR and HDR video use the same color space. Color gamut mapping may be combined with various techniques. There may be goals, such as preserving color (e.g., where WCG and SCG domains overlap) and compressing WCG data into a smaller SCG domain. A compromise may be achieved, for example, by defining two maps and a blending between the two maps. The blending between the two maps may be based on the distance at which a color is from a neutral white axis. A map may be used to convert between WCG and SCG, for example, after HDR to SDR conversion at an encoder and/or before SDR to HDR conversion at a decoder.

FIG. 18 shows an example post processing that includes color gamut mapping with SDR to HDR conversion. FIG. 18 shows example placement of the SCG to WCG mapping in the decoder process and/or post processing. The SCG to WCG mapping 1810 may be performed after one or more of the following: chroma upsampling 1804, color space conversion (e.g., YUV to R'G'B') 1806, and transformation of R'G'B' to linear RGB 1808. The SCG to WCG mapping 1810 may be placed before SDR to HDR 1812. Color gamut mapping (e.g., the color gamut mapping as shown in FIG. 18) may convert RGB values between appropriate WCG and SCG domains with relatively low complexity. A parameterized conversion may be used on WCG data to map it into the SCG region of RGB values in the WCG domain.

Given primaries for WCG and SCG, a matrix $M_{WCGtoSCG}$ converting RGB data expressed in WCG primaries to RGB data expressed with the SCG primaries may be used. A matrix converting RGB data expressed in SCG primaries may be expressed in WCG primaries using a matrix $M_{SCGtoWCG}$. The conversions herein may provide colorimetric relations, where a physical color may be represented in two or more different RGB coordinate systems. An identity map that uses the same RGB values for both color primaries may be used.

Mapping may have multiple properties. The properties may include that colorimetric conversion may be used to preserve color where possible, for example, for colors well within the common color gamut. The properties may include that a (e.g., an entire) WCG color gamut may be mapped into an SCG gamut with physically realizable values. A compromise may be achieved, for example, by blending desired properties to preserve physical color. Out-of-range values may be generated. RGB values that are physically realizable but may introduce color distortion may be reused. When making such a compromise, a smooth transition between these colorimetrics may avoid visual artifacts, e.g., due to abrupt transitions or clipping.

FIG. 19 shows an example of WCG to SCG mapping. FIG. 20 shows an example of SCG to WCG mapping. The structures of conversion from WCG to SCG at the encoder and from SCG to WCG at the decoder may use similar algorithms. e.g., as shown in FIGS. 19 and 20. Mapping may differ in the use of the conversion matrix $M_{WCGtoSCG}$ and $M_{SCGtoWCG}$ and blending function details. An example blending process is shown in FIGS. 19 and 20. In the example, a single blending value may be calculated from the saturation estimate of the content (e.g., 1904 to 1906 and 2004 to 2006) with a ratio of minimum to maximum. A blending factor may, for example, depend on the saturation of the color, e.g., for colors well within the SCG. A blending factor may have a constant value of one (1), which may correspond to the color metric example described herein. A single blending value may be used to form a weighted combination of an original and a color conversion defined by a conversion matrix.

FIG. 21 shows an example of encoder side blending factor calculation. FIG. 21 shows a plot illustrating the behavior of a blending function F(S) used at the encoder. FIG. 22 shows an example of decoder side blending factor calculation. FIG. 22 shows a plot illustrating the behavior of a blending function G(S) used at the decoder.

Behaviors of a blending function G(S) used at the decoder and of a blending function F(S) used at the encoder may be similar. As shown in FIG. 21 and FIG. 22, a blending function of one (1) may be for values that are below a threshold. A blending function may decrease to zero at full saturation, e.g., when S is equal to one (1). The decreasing blending function may be smooth and invertible. F(S) may provide color compression at S above a threshold while G(S) may be used to enable color expansion above a threshold. A change in primaries from WCG to SCG for F(S) relative to SCG to WCG for G(S) may lead to a difference in plots. A fixed RGB value may result in decreased color saturation when used with SCG primaries, for example, when going from WCG to SCG. A fixed RGB value may result in increased color saturation when used with WCG primaries, for example, when going from SCG to WCG.

FIG. 19 shows an example of signal flow through for encoder side WCG to SCG processing. Processing 1900 may be applied, for example, to each RGB triple of a pixel expressed relative to the WCG primaries at 1902. A saturation correlate S 1904 may be computed as one (1) minus the ratio of maximum RGB value to minimum RGB value. Full white may have equal RGB values giving an S value of zero while fully saturated signals may have at least one primary zero giving an S value of one (1). A value S may be used to determine a blending factor 1906, for example, by using a function that is one (1) below a threshold and decreases to zero at S=1, e.g., as shown in FIG. 21. A colorimetric value may be calculated, for example, by applying a color primary conversion matrix $M_{WCGtoSCG}$ at 1916. This may have the effect of increasing RGB values to compensate for desaturated primaries in an SCG representation. Increased values may be within an SCG gamut and may be physically realizable, for example, for RGB values with low saturation. A blending factor F(S) may be used to form a weighted sum of colorimetric conversion and original RGB values at 1914 and 1910. The output may be designated the SCG RGB triple at 1912. An F(S) below the threshold may reduce to colorimetric conversion, for example, given a blending factor of one. Full saturation (e.g. S=1) may reduce to the reuse of RGB values for SCG with the corresponding color desaturation introduced as a consequence of fitting in the SCG gamut at 1908. Saturation and blending functions may vary smoothly between these extremes.

FIG. 20 shows an example of signal flow through for decoder side SCG to WCG processing. Signal flow for decoder side SCG to WCG processing 2000 may be similar to encoder side WCG to SCG processing 1900. Processing may be applied to a RGB triple of a pixel expressed relative to the SCG primaries at 2002. A saturation correlate S 2004 may be computed as one (1) minus the ratio of maximum RGB value to minimum RGB value. Full white may have equal RGB values giving an S value of zero while fully saturated signals may have at least one primary zero giving an S value of one (1). A value S may be used to determine a blending factor 2006, for example, by using a function that is one (1) below a threshold and decreases to zero at S=1, e.g., as shown in FIG. 22. The blending function G(S) used at the decoder may be similar to F(S), e.g., as shown in FIG. 21. G(S) may not be identical to F(S). The function G(S) may be one (1) below a threshold and may decrease to zero as S increases to 1. A colorimetric value may be calculated, for example, by applying the color primary conversion matrix $M_{SCGtoWCG}$ at 2016. RGB values may be reduced to account for more saturated primaries of the WCG representation. The blending factor G(S) may be used to form a weighted sum of the colorimetric conversion and the original RGB values at 2014 and 2010. The output may be designated as the WCG RGB triple at 2012. A G(S) below the threshold may reduce to colorimetric conversion, for example, given a blending factor of one. Full saturation (e.g., S=1) may reduce to the reuse of RGB values for WCG with the corresponding increase in color saturation introduced by the extended primaries of the WCG representation, e.g., at 2008. Saturation and blending functions may vary smoothly between these extremes.

Figure 23A:
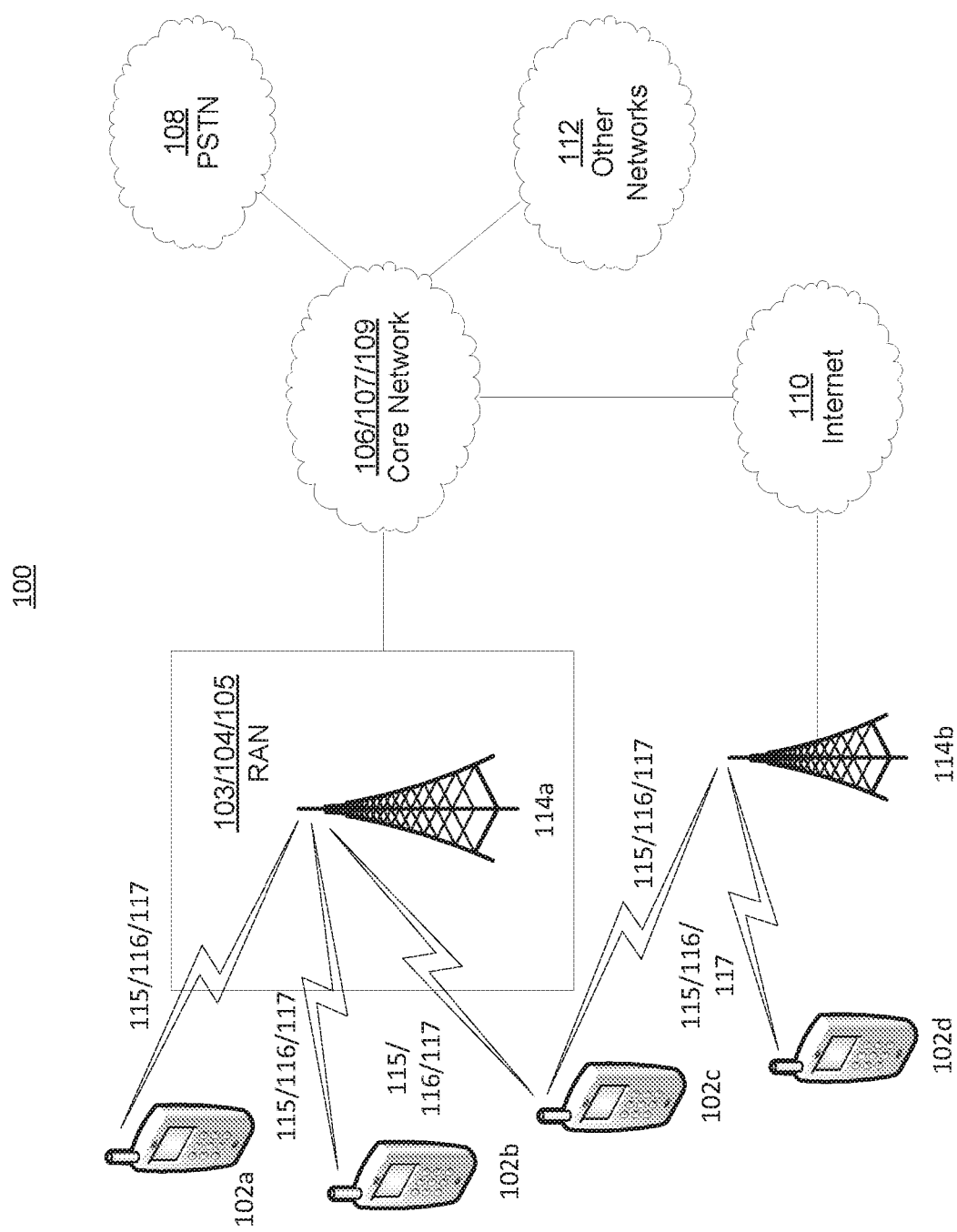
FIG. 23A is a system diagram of an example communications system in which one or more disclosed embodiments may be implemented.

FIG. 23A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 23A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA. OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 23A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the V TRUs 102c, 102d may utilize a cellular-based RAT (e.g., WCDMA, CDMA2000, GSM, LTE, LTE-A, etc.) to establish a picocell or femtocell. As shown in FIG. 23A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 23A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 23A may be configured to communicate with the base station 114a, which may employ a cellular-based radio technology, and with the base station 114b, which may employ an IEEE 802 radio technology.

Figure 23B:
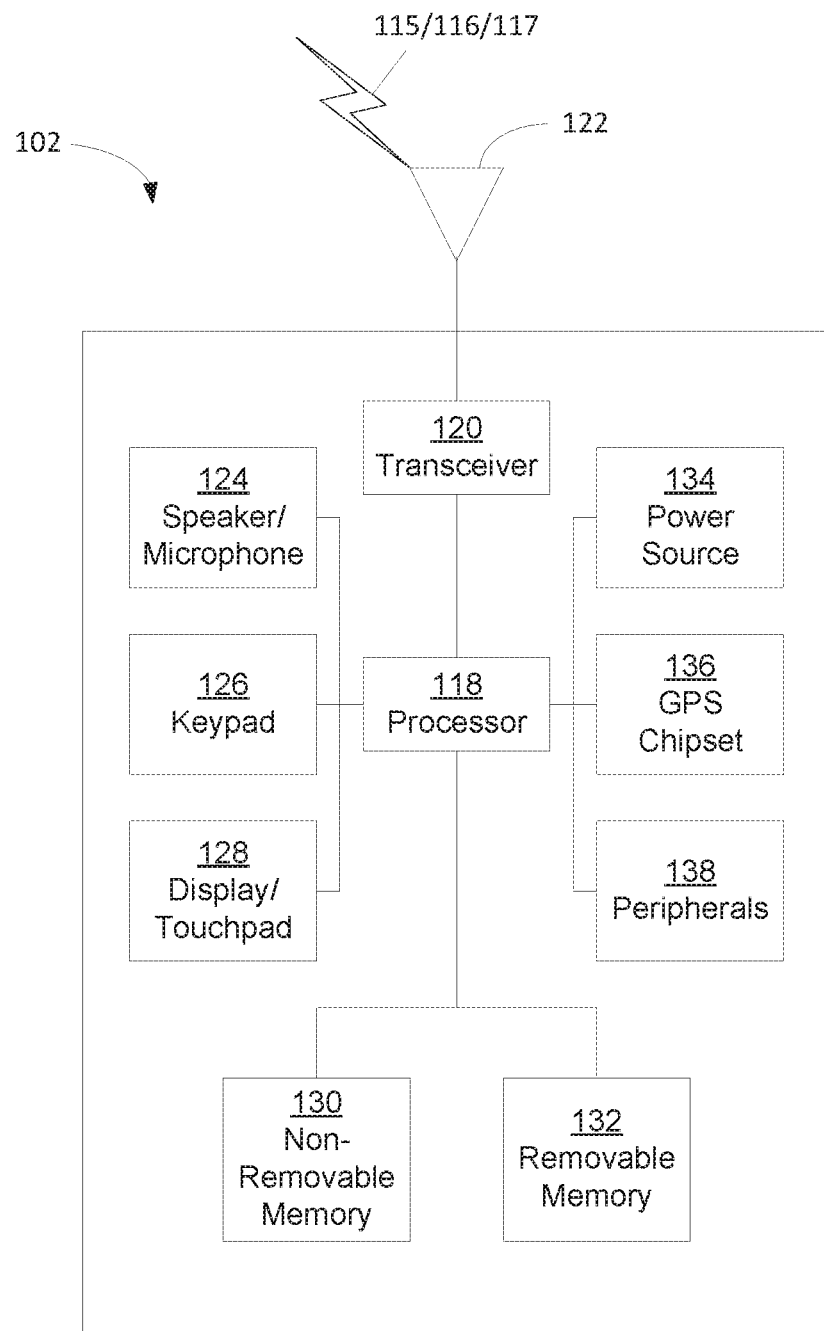
FIG. 23B is a system diagram of an example wireless transmit/receive unit (WTRU) that may be used within the communications system illustrated in FIG. 23A.

FIG. 23B is a system diagram of an example WTRU 102. As shown in FIG. 23B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 23B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 23B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 23B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 23C:
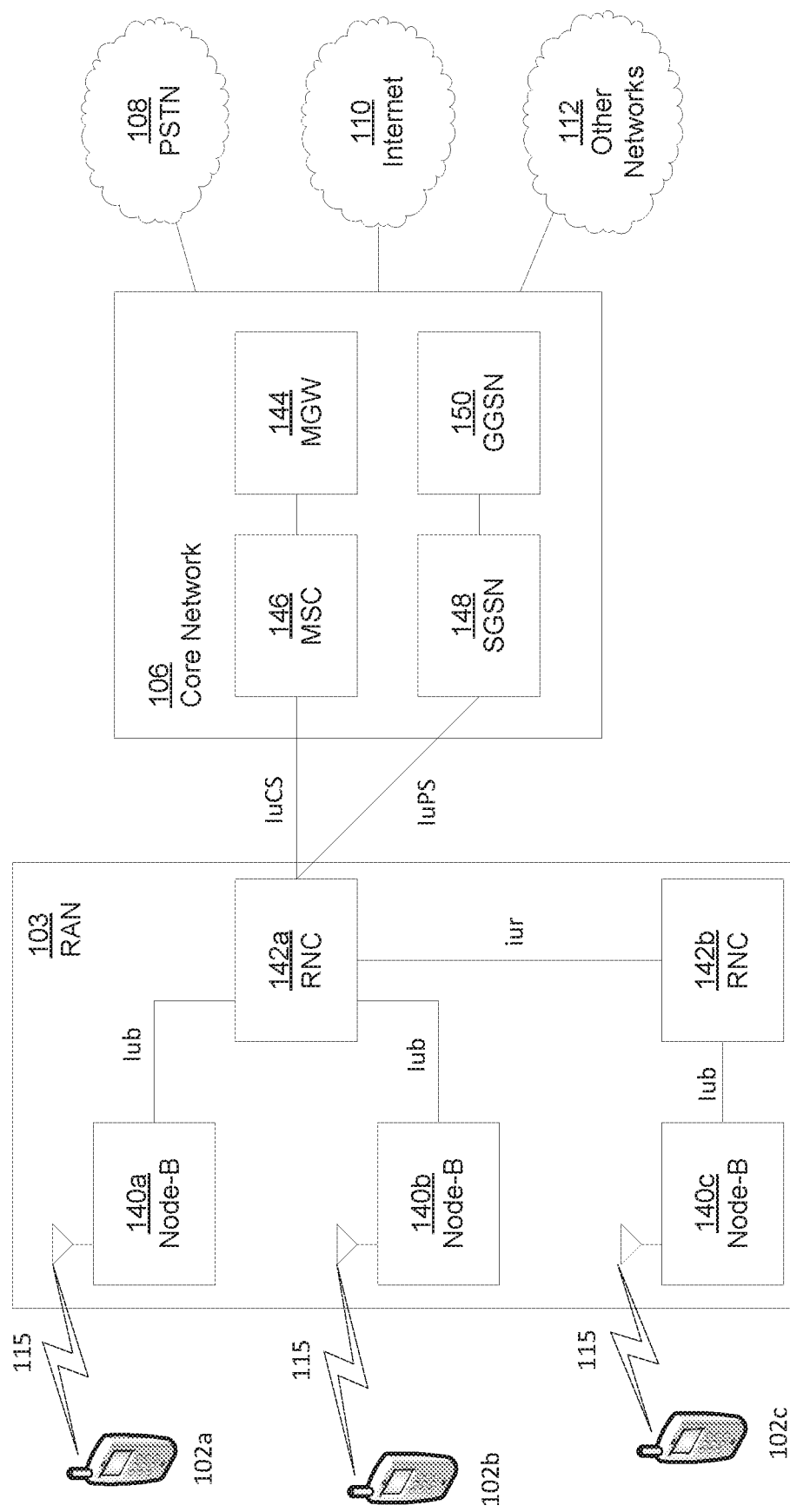
FIG. 23C is a system diagram of an example radio access network and an example core network that may be used within the communications system illustrated in FIG. 23A.

FIG. 23C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 23C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 23C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a. 142b may be configured to carry out or support other functionality, such as outer loop power control, load control, admission control, packet scheduling, handover control, macrodiversity, security functions, data encryption, and the like.

The core network 106 shown in FIG. 23C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 23D:
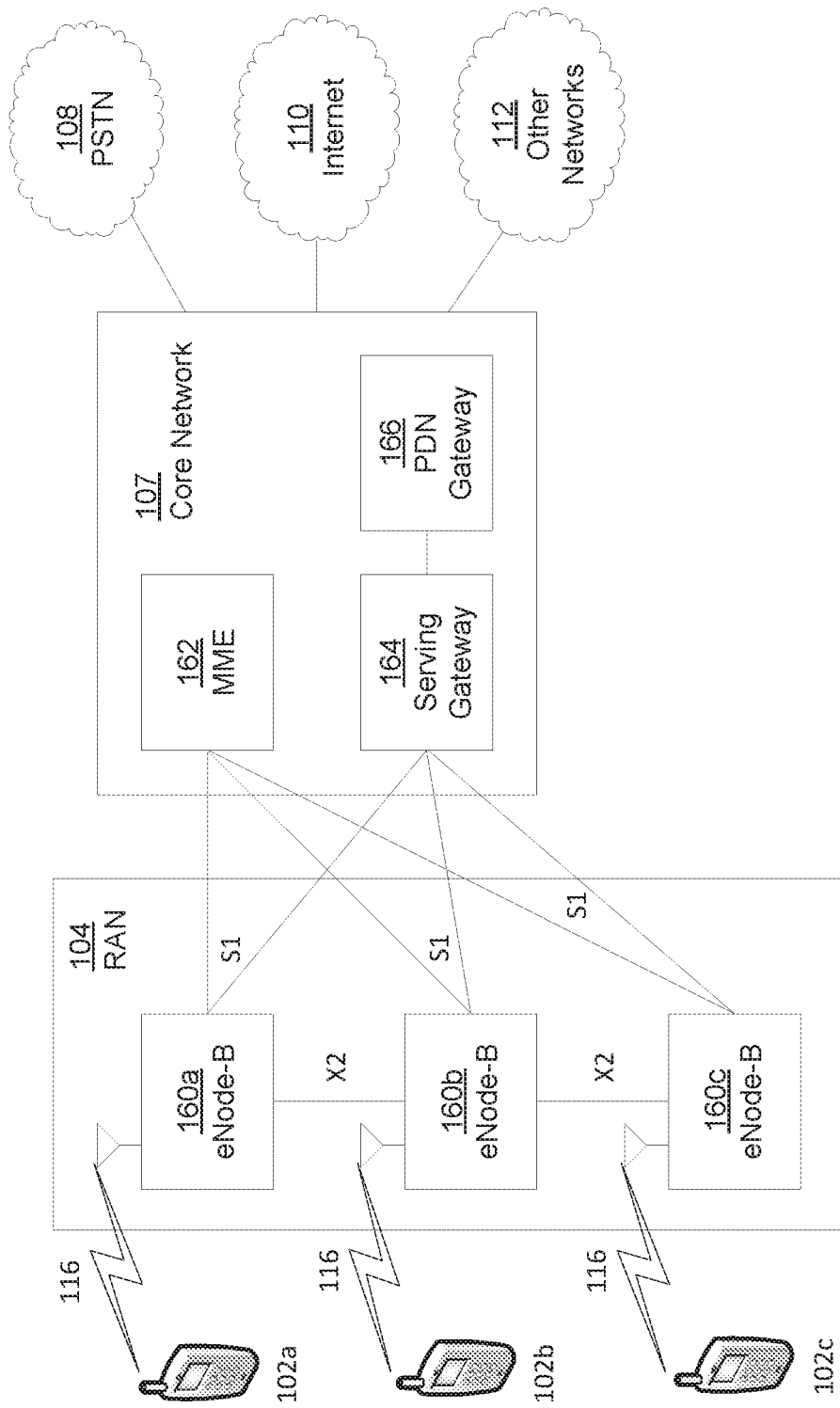
FIG. 23D is a system diagram of another example radio access network and an example core network that may be used within the communications system illustrated in FIG. 23A.

FIG. 23D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b. 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a. 160b, 160c may implement MIMO technology. Thus, the eNode-B 160a, for example, may use multiple antennas to transmit wireless signals to, and receive wireless signals from, the WTRU 102a.

Each of the eNode-Bs 160a. 160b, 160c may be associated with a particular cell (not shown) and may be configured to handle radio resource management decisions, handover decisions, scheduling of users in the uplink and/or downlink, and the like. As shown in FIG. 23D, the eNode-Bs 160a. 160b, 160c may communicate with one another over an X2 interface.

The core network 107 shown in FIG. 23D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 23E:
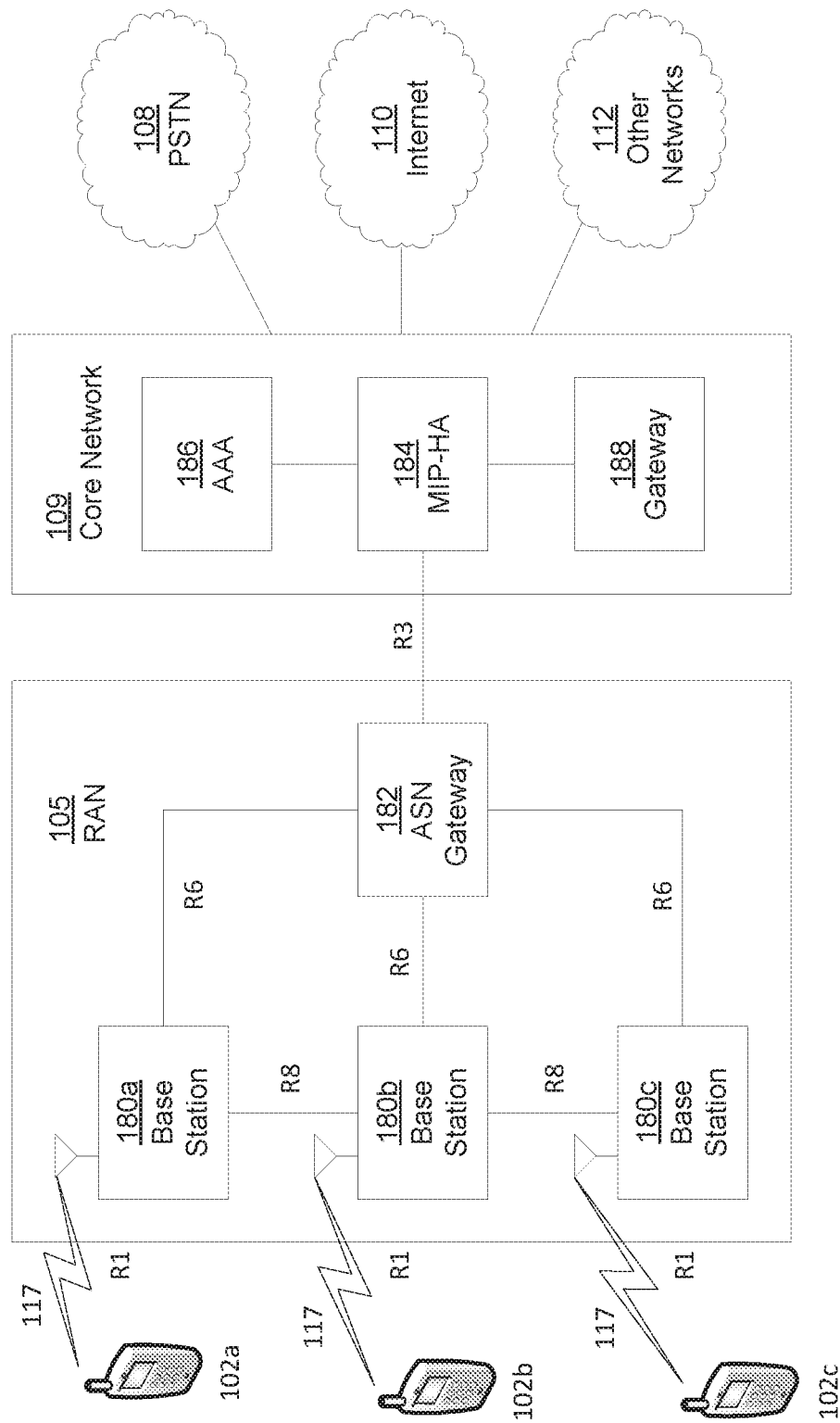
FIG. 23E is a system diagram of another example radio access network and an example core network that may be used within the communications system illustrated in FIG. 23A.

FIG. 23E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 23E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a. 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an RI reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 23E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 23E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities have been disclosed for unification of high dynamic range (HDR) video coding architectures. Unified HDR video coding may be provided, for example, by providing multi-mode pre and/or post encoding or decoding processing dependent upon an operating mode, e.g., an HDR operating mode and a standard dynamic range (SDR) compatible operating mode. An encoding or decoding apparatus or system may comprise, for example, HDR only, SDR compatible and common encoding or decoding processing functions. HDR-only functions may comprise, for example, adaptive reshaping, which may be provided with adaptive reshaping and operating mode metadata. SDR compatible functions may comprise, for example, scaling factor derivation, color gamut mapping and dynamic range conversion functions, which may be provided with modulation factor and/or operating mode metadata. Common functions may comprise, for example, chroma upsampling, color enhancement, color space conversion and adaptive transfer function (ATF)/EOTF functions, which may be provided with color enhancement or color space metadata. Alternately or additionally, the adaptive reshaping tool may be applied with SDR compatible solutions as a common tool. A unified scalable encoder or decoder in a scalable encoding or decoding system may process and/or convey both SDR and HDR video.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A high dynamic range (HDR) signal processing device comprising:
   a processor configured to:
   receive a video signal and an operating mode indication configured to indicate a format of the video signal;
   determine whether to perform adaptive reshaping on the video signal based on the operating mode indication, wherein the processor is configured to determine to perform the adaptive reshaping on a condition that the operating mode indicates that the video signal is in an HDR format, and determine to bypass the adaptive reshaping on a condition that the operating mode indicates that the video signal is in a non-HDR format;
   determine whether to perform color gamut mapping on the video signal based on the operating mode indication, wherein the processor is configured to determine to perform the color gamut mapping on a condition that the operating mode indicates that the video signal is in the non-HDR format, and determine to bypass the color gamut mapping on a condition that the operating mode indicates that the video signal is in the HDR format; and
   process the video signal based on the determination of whether to perform adaptive reshaping and the determination of whether to perform color gamut mapping.

2. The signal processing device of claim 1, wherein the processor is configured to:
   receive a plurality of types of HDR reconstruction metadata via a network abstraction layer (NAL) unit, wherein the plurality of types of HDR reconstruction metadata comprises at least one of the operating mode indication, adaptive reshaping metadata, modulation factor metadata, color enhancement metadata, or color space metadata.

3. The signal processing device of claim 1, wherein the processor is configured to:
   based on the determination to perform the adaptive reshaping, identify adaptive reshaping HDR reconstruction metadata and perform the adaptive reshaping on the video signal using the adaptive reshaping metadata.

4. The signal processing device of claim 1, wherein the processor is configured to receive a plurality of types of HDR reconstruction metadata via a high priority message, each type of the HDR reconstruction metadata being associated with a payload type.

5. The signal processing device of claim 1, wherein the processor is further configured to:
perform a transfer function on the video signal based on the operating mode indication, wherein on the condition that the operating mode indicates that the video signal is in the HDR format, the processor is further configured to identify adaptive reshaping metadata associated with the video signal and perform the transfer function using the adaptive reshaping metadata.

6. The signal processing device of claim 1, wherein the processor is further configured to:
perform chroma upsampling on the video signal, wherein the chroma upsampling is performed based on an output of the adaptive shaping on the condition that the operating mode indicates that the video signal is in the HDR format.

7. The signal processing device of claim 1, wherein the processor is further configured to:
identify color enhancement metadata associated with the video signal; and
perform color enhancement on the video signal using the color enhancement metadata.

8. The signal processing device of claim 1, wherein the processor is further configured to perform color enhancement on the video signal based on an output of chroma upsampling.

9. The signal processing device of claim 1, wherein the processor is further configured to:
identify color space metadata associated with color space conversion; and
perform the color space conversion on the video signal using the color space metadata.

10. The signal processing device of claim 1, wherein the processor is further configured to perform color space conversion on the video signal, wherein the color space conversion is performed based on an output of the color gamut mapping on the condition that the operating mode indicates that the video signal is in the non-HDR format.

11. A high dynamic range (HDR) signal processing device comprising: a processor configured to:
receive a video signal and an operating mode indication configured to indicate a format of the video signal;
determine whether to perform adaptive reshaping on the video signal based on the operating mode indication, wherein the processor is configured to determine to perform the adaptive reshaping on a condition that the operating mode indicates that the video signal is in an HDR format, and determine to bypass the adaptive reshaping on a condition that the operating mode indicates that the video signal is in a non-HDR format;
determine whether to perform scaling factor derivation on the video signal based on the operating mode indication, wherein the processor is configured to determine to perform the scaling factor derivation on a condition that the operating mode indicates that the video signal is in the non-HDR format, and determine to bypass the scaling factor derivation on a condition that the operating mode indicates that the video signal is in the HDR format; and
process the video signal based on the determination of whether to perform adaptive reshaping and the determination of whether to perform the scaling factor derivation.

12. The signal processing device of claim 11, wherein the processor, based on the determination to perform the scaling factor derivation, is further configured to identify modulation factor metadata associated with the scaling factor derivation and perform the scaling factor derivation on the video signal using the modulation factor metadata.

13. A high dynamic range (HDR) signal processing device comprising: a processor configured to:
receive a video signal and an operating mode indication configured to indicate a format of the video signal;
determine whether to perform adaptive reshaping on the video signal based on the operating mode indication, wherein the processor is configured to determine to perform the adaptive reshaping on a condition that the operating mode indicates that the video signal is in an HDR format, and determine to bypass the adaptive reshaping on a condition that the operating mode indicates that the video signal is in a non-HDR format;
determine whether to perform dynamic range conversion on the video signal based on the operating mode indication, wherein the processor is configured to determine to perform the dynamic range conversion on a condition that the operating mode indicates that the video signal is in the non-HDR format, and determine to bypass the dynamic range conversion on a condition that the operating mode indicates that the video signal is in the HDR format; and
process the video signal based on the determination of whether to perform adaptive reshaping and the determination of whether to perform the dynamic range conversion.

14. A video signal processing method comprising:
receiving a video signal and an operating mode indication configured to indicate a format of the video signal;
determining whether to perform adaptive reshaping on the video signal based on the operating mode indication, wherein a determination to perform the adaptive reshaping is made on a condition that the operating mode indicates that the video signal is in a high dynamic range (HDR) format, and a determination to bypass the adaptive reshaping is made on a condition that the operating mode indicates that the video signal is in a non-HDR format;
determining whether to perform color gamut mapping on the video signal based on the operating mode indication, wherein the determination to perform the color gamut mapping is made on a condition that the operating mode indicates that the video signal is in the non-HDR format, and a determination to bypass the color gamut mapping is made on a condition that the operating mode indicates that the video signal is in the HDR format; and
processing the video signal based on the determination of whether to perform adaptive reshaping and the determination of whether to perform color gamut mapping.

15. The method of claim 14, the method further comprising:
receiving a plurality of types of HDR reconstruction metadata via a network abstraction layer (NAL) unit, wherein the plurality of types of HDR reconstruction metadata comprises at least one of the operating mode indication, adaptive reshaping metadata, modulation factor metadata, color enhancement metadata, or color space metadata.

16. The method of claim 14, the method further comprising:
based on the determination to perform the adaptive reshaping, identifying adaptive reshaping HDR reconstruction metadata and performing the adaptive reshaping on the video signal using the adaptive reshaping metadata.

17. The method of claim 14, the method further comprising receiving a plurality of types of HDR reconstruction metadata via a high priority message, each type of the HDR reconstruction metadata being associated with a payload type.

18. The method of claim 14, the method further comprising performing a transfer function on the video signal based on the operating mode indication, wherein on the condition that the operating mode indicates that the video signal is in the HDR format, the method further comprises identifying adaptive reshaping metadata associated with the video signal and performing the transfer function using the adaptive reshaping metadata.

19. A video signal processing method comprising:
receiving a video signal and an operating mode indication configured to indicate a format of the video signal;
determining whether to perform adaptive reshaping on the video signal based on the operating mode indication, wherein a determination to perform the adaptive reshaping is made on a condition that the operating mode indicates that the video signal is in a high dynamic range (HDR) format, and a determination to bypass the adaptive reshaping is made on a condition that the operating mode indicates that the video signal is in a non-HDR format;
determining whether to perform scaling factor derivation on the video signal based on the operating mode indication, wherein a determination to perform the scaling factor derivation is made on a condition that the operating mode indicates that the video signal is in the non-HDR format, and a determination to bypass the scaling factor derivation is made on a condition that the operating mode indicates that the video signal is in the HDR format; and
processing the video signal based on the determination of whether to perform adaptive reshaping and the determination of whether to perform the scaling factor derivation.

20. The method of claim 19, further comprising:
based on the determination to perform the scaling factor derivation, performing the scaling factor derivation based on an output of color enhancement.

21. The method of claim 19, the method further comprising: based on the determination to perform the scaling factor derivation, identifying modulation factor metadata associated with the scaling factor derivation and performing the scaling factor derivation on the video signal using the modulation factor metadata.

22. A video signal processing method comprising:
receiving a video signal and an operating mode indication configured to indicate a format of the video signal;
determining whether to perform adaptive reshaping on the video signal based on the operating mode indication, wherein a determination to perform the adaptive reshaping is made on a condition that the operating mode indicates that the video signal is in a high dynamic range (HDR) format, and a determination to bypass the adaptive reshaping is made on a condition that the operating mode indicates that the video signal is in a non-HDR format; and
determining whether to perform dynamic range conversion on the video signal based on the operating mode indication, wherein a determination to perform the dynamic range conversion is made on a condition that the operating mode indicates that the video signal is in the non-HDR format, and a determination to bypass the dynamic range conversion is made on a condition that the operating mode indicates that the video signal is in the HDR format; and
processing the video signal based on the determination of whether to perform adaptive reshaping and the determination of whether to perform dynamic range conversion.

23. The method of claim 22, further comprising:
based on the determination to perform the dynamic range conversion, performing the dynamic range conversion based on one or more of an output of color space conversion or an output of scaling factor derivation.

24. The signal processing device of claim 1, wherein the processor is configured to:
based on the determination to perform the color gamut mapping, perform the color gamut mapping based on an output of color enhancement.

25. The signal processing device of claim 11, wherein the processor is configured to:
based on the determination to perform the scaling factor derivation, perform the scaling factor derivation based on an output of color enhancement.

26. The signal processing device of claim 13, wherein the processor is configured to:
based on the determination to perform the dynamic range conversion, perform the dynamic range conversion based on one or more of an output of color space conversion or an output of scaling factor derivation.

27. The method of claim 14, further comprising:
based on the determination to perform the color gamut mapping, performing the color gamut mapping based on an output of color enhancement.

* * * * *